US006813099B2

(12) United States Patent
Yamaguchi

(10) Patent No.: US 6,813,099 B2
(45) Date of Patent: Nov. 2, 2004

(54) IMAGE PICKUP LENS, IMAGE PICKUP UNIT AND PORTABLE TERMINAL

(75) Inventor: Susumu Yamaguchi, Hachioji (JP)

(73) Assignee: Konica Corporation, Tokyo (JP)

(*) Notice: Subject to any disclaimer, the term of this patent is extended or adjusted under 35 U.S.C. 154(b) by 0 days.

(21) Appl. No.: 10/614,596

(22) Filed: Jul. 7, 2003

(65) Prior Publication Data
US 2004/0012861 A1 Jan. 22, 2004

(30) Foreign Application Priority Data

Jul. 18, 2002 (JP) ......................... 2002-209625

(51) Int. Cl.$^7$ .......................... G02B 9/34; H04N 5/225
(52) U.S. Cl. ..................... 359/779; 359/772; 359/771; 348/340
(58) Field of Search .............................. 359/771, 772, 359/779, 760, 768, 769, 660, 715, 686, 747; 348/335, 340, 374, 375

(56) References Cited

U.S. PATENT DOCUMENTS 5,739,966 A * 4/1998 Tanaka ........................ 359/779
6,744,570 B1 * 6/2004 Isono .......................... 359/772

* cited by examiner

Primary Examiner—Georgia Epps
Assistant Examiner—Jack Dinh
(74) Attorney, Agent, or Firm—Cohen, Pontani, Lieberman & Pavane

(57) ABSTRACT

An image pickup lens has four lenses arranged in an order of a first lens, a second lens, a third lens and a fourth lens from an object side. The first lens has positive refractive power and has a convex surface facing toward an object side, the second lens has the positive refractive power, the third lens has negative refractive power and has a concave surface facing toward the object side to be formed in a meniscus shape, and the fourth lens has the positive or negative refractive power and has a convex surface facing toward the object side to be formed in the meniscus shape.

21 Claims, 11 Drawing Sheets

F2.88

—— d-LINE
---- g-LINE

-0.1  0  0.1
SPHERICAL
ABERRATION

Y=3.24

—— S
---- M

-0.1  0  0.1
ASTIGMATISM

Y=3.24

-2  0  2%
DISTORTION

Y=3.24

—— d-LINE
---- g-LINE

Y=1.62

COMA(M)

FIG.11A
FIG.11B
FIG.11C
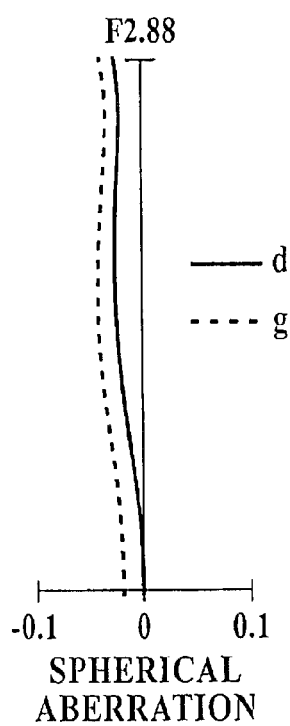
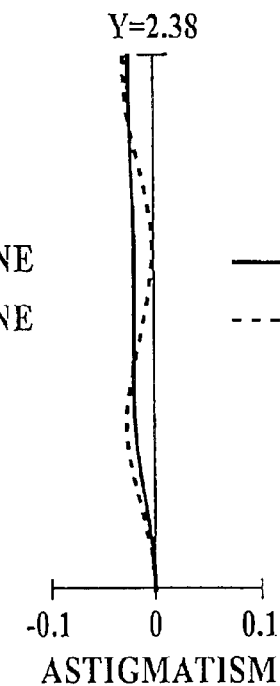
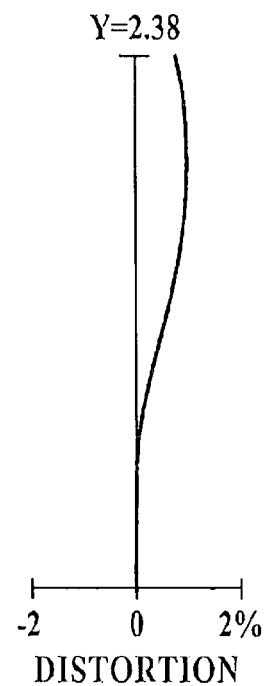
FIG.11D
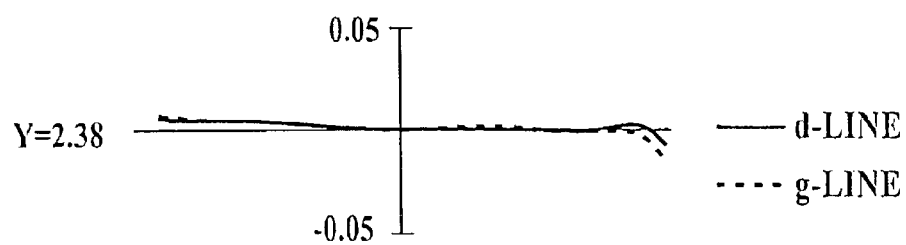
FIG.11E
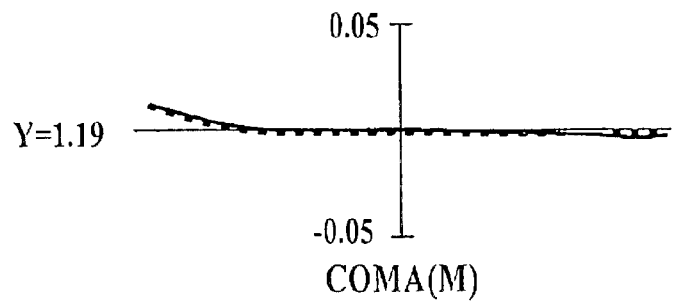

US 6,813,099 B2

IMAGE PICKUP LENS, IMAGE PICKUP UNIT AND PORTABLE TERMINAL

BACKGROUND OF THE INVENTION

1. Field of the Invention

The invention relates to an image pickup lens preferable as an optical system of a solid state pickup element such as a CCD type image sensor or a CMOS type image sensor, an image pickup unit having the image pickup lens, and a portable terminal having the image pickup unit.

2. Description of Related Art

In recent years, with the heightened performance and the miniaturization of an image pickup device using a solid-state image pickup element such as a CCD (charge coupled device) type image sensor or a CMOS (complementary metal oxide semiconductor) type image sensor, a portable terminal and a personal computer respectively having the image pickup device have spread to users.

Also, with the miniaturization and the dense arrangement of pixels of the element due to the increase of functions in the portable terminal and the personal computer, the further miniaturization of an image pickup lens mounted on the image pickup device is strongly required for the miniaturization of the image pickup device.

In recent years, because a triplet lens structure can have higher performance as compared with a single lens structure and a doublet lens structure, the triplet lens structure composed of a first lens having the positive refractive power, a second lens having the negative refractive power and a third lens having the positive refractive power arranged in that order from an object side has been generally used as an image pickup lens of a small-sized image pickup device. This triplet type image pickup lens is disclosed in Published Unexamined Japanese Patent Application (Tokukai) No. 2001-75006.

However, in the image pickup lens disclosed in the Application No. 2001-75006, though various types aberration are preferably corrected while maintaining the wide angle of view, the image pickup lens is not appropriate to the shortening of a total lens length (that is, a distance from an aperture stop to a focal point on an image side) along an optical axis.

SUMMARY OF THE INVENTION

In an order to solve the above problem, an object of the present invention is to provide an image pickup lens which is composed of a plurality of lenses and is miniaturized, an image pickup unit and a portable terminal.

In an order to accomplish the above-mentioned object, in accordance with the first aspect of the present invention, an image pickup lens comprising four lenses arranged in an order of a first lens, a second lens, a third lens and a fourth lens from an object side, wherein the first lens has positive refractive power and has a convex surface facing toward the object side, the second lens has the positive refractive power, the third lens has negative refractive power and has a concave surface facing toward the object side to be formed in a meniscus shape, and the fourth lens has the positive or negative refractive power and has a convex surface facing toward the object side to be formed in the meniscus shape.

In the above configuration, four lenses are arranged in an order of the first, second, third and fourth lenses. In use, the first lens is placed on the object side, and the fourth lens is placed on an image side. In this use condition, the positive lens group and the negative lens respectively having the comparatively strong refractive power are arranged in that order from the object side, and the convex surface of the first lens faces toward the object side. Therefore, a total lens length is shortened. Here, the total lens length denotes a distance on an optical axis from the object side surface of the first lens to an image side focal point of the whole image pickup lens. However, in the image pickup lens having an aperture stop arranged nearest to the object side, the total lens length denotes a distance on an optical axis from the aperture stop to the image side focal point of the whole image pickup lens. This definition of the total lens length is effective in this specification including claims.

Also, the concave surface of the third lens formed in the meniscus shape faces toward the object side, and the convex surface of the fourth lens formed in the meniscus shape faces toward the object side. Therefore, an air lens having the positive refractive power is formed between the third and fourth lenses. Accordingly, the total lens length can be further shortened, and a telecentric characteristic can be maintained in the periphery of an image screen.

Here, the fourth lens has the shape and orientation of the convex surface described above and can have the positive or negative refractive power. Hereinafter, "positive or negative refractive power" denotes that any of the positive refractive power and the negative refractive power is allowed.

Preferably, following conditional formulas (1), (2) and (3) are satisfied:

$$L/2Y<1.60 \tag{1}$$
$$0.40<f12/f<0.70 \tag{2}$$
$$25<\{(\nu1+\nu2)/2\}-\nu3 \tag{3},$$

where L denotes a distance on an optical axis from the object side surface of the first lens to an image side focal point of the whole image pickup lens, 2Y denotes the length of a diagonal line on an effective image screen, f12 denotes a combined focal length of the first lens and the second lens, f denotes a focal length of the whole image pickup lens, ν1 denotes an Abbe number of the first lens, ν2 denotes an Abbe number of the second lens, and ν3 denotes an Abbe number of the third lens.

The conditional formulas (1) to (3) indicate conditions for obtaining a miniaturized image pickup lens in which aberration is preferably corrected. Here, L of the conditional formula (1) denotes a distance on an optical axis from the object side surface of the first lens to the image side focal point of the whole image pickup lens. The "image side focal point" denotes an image point obtained when a parallel ray parallel to the optical axis is incident on the image pickup lens. Also, when an optical member of a plane parallel plate shape such as a low pass filter is arranged in a space between the surface of the image pickup lens nearest to the image side and the image side focal point, the distance L is converted into a distance L in air, and the distance L in air satisfies the formula (1).

The conditional formula (1) indicates a condition for achieving the shortening of the total lens length. When L/2Y is lower than the upper limit of the conditional formula (1), the total lens length is directed to be shortened.

Also, as to the conditional formula (2) for appropriately setting the combined focal length of the first lens and the second lens, when f12/f is set to be higher than the lower limit, the combined positive refractive power of the first lens and the second lens is not excessively enlarged, the generation of both the high-order spherical aberration and the coma can be suppressed. Also, when f12/f is set to be lower than the upper limit, the combined positive refractive power of the first lens and the second lens is appropriately obtained, and the total lens length can be shortened.

Also, as to the conditional formula (3) for the correction of the chromatic aberration in the first and second lenses having the positive refractive power and the third lens having the negative refractive power, when $\{(v1+v2)/2\}-v3$ is set to be higher than the lower limit, the axial chromatic aberration and the lateral chromatic aberration can be corrected.

Preferably, an aperture stop is arranged nearest to the object side. Because of the configuration of the aperture stop arranged nearest to the object side, the position of an exit pupil can be set away from an image surface. Therefore, a principal ray of a light flux emerging from the final surface of the lenses is incident on a solid-state image pickup element at an angle near a right angle. That is, the image side telecentric characteristic required for the image pickup lens of the solid-state image pickup element can be preferably obtained, and a shading phenomenon in the periphery of an image screen can be reduced.

Preferably, the image pickup lens satisfies following conditional formulas (4), (5) and (6):

$$L'/2Y<1.60 \qquad (4)$$

$$0.40<f12/f<0.70 \qquad (5)$$

$$25<\{(v1+v2)/2\}-v3 \qquad (6),$$

where L' denotes a distance on an optical axis from the aperture stop to an image side focal point of the whole image pickup lens, 2Y denotes the length of a diagonal line on an effective image screen, f12 denotes a combined focal length of the first lens and the second lens, f denotes a focal length of the whole image pickup lens, v1 denotes an Abbe number of the first lens, v2 denotes an Abbe number of the second lens, and v3 denotes an Abbe number of the third lens.

The conditional formulas (4) to (6) indicate conditions for obtaining a miniaturized image pickup lens in which aberration is preferably corrected. Here, L' of the conditional formula (4) denotes a distance on an optical axis from the aperture stop to the image side focal point of the whole image pickup lens. The "image side focal point" denotes an image point obtained when a parallel ray parallel to the optical axis is incident on the image pickup lens. Also, when an optical member of a plane parallel plate shape such as a low pass filter is arranged in a space between the surface of the image pickup lens nearest to the image side and the image side focal point, the distance L' is converted into a distance L' in air, and the distance L' in air satisfies the formula (4).

The conditional formula (4) indicates a condition for achieving the shortening of the total lens length. When L'/2Y is lower than the upper limit of the conditional formula (4), the total lens length is directed to be shortened.

Also, as to the conditional formula (5) for appropriately setting the combined focal length of the first lens and the second lens, when f12/f is set to be higher than the lower limit, the combined positive refractive power of the first lens and the second lens is not excessively enlarged, the generation of both the high-order spherical aberration and the coma can be suppressed. Also, when f12/f is set to be lower than the upper limit, the combined positive refractive power of the first lens and the second lens is appropriately obtained, and the total lens length can be shortened.

Also, as to the conditional formula (6) for the correction of the chromatic aberration in the first and second lenses having the positive refractive power and the third lens having the negative refractive power, when $\{(v1+v2)/2\}-v3$ is set to be higher than the lower limit, the axial chromatic aberration and the lateral chromatic aberration can be corrected.

When an aperture stop is arranged nearest to the object side, the total lens length can be set to a distance from the aperture stop to the image side focal point of the whole image pickup lens, and the calculation based on the total lens length is preferred.

Preferably, following conditional formulas (7) and (8) are satisfied:

$$-0.40<R5/((N3-1)\cdot f)<-0.20 \qquad (7)$$

$$0.30<fa/f21\ 0.50 \qquad (8),$$

where f denotes a focal length of the whole image pickup lens, R5 denotes a curvature radius of the object side surface of the third lens facing, N3 denotes a refractive index of the third lens at a d-line, and fa denotes a focal length of an air lens formed by an image side surface of the third lens and the object side surface of the fourth lens.

When the negative refractive power of the object side surface of the third lens is appropriately set, the conditional formula (7) indicates a condition for easily correcting a curvature of the image surface and flattening the image surface. Here, the focal length of the object side surface of the third lens is expressed by R5/(N3−1) by using the curvature radius R5 and the refractive index N3 of the third lens. The conditional formula (7) indicates a ratio of the focal length of the object side surface of the third lens to the focal length of the whole image pickup lens.

When $R5/((N3-1)\cdot f)$ is lower than the higher limit of the conditional formula (7), the negative refractive power of the object side surface of the third lens is not excessively enlarged, and the generation of excessive spherical aberration and the generation of coma flare of an abaxial light flux can be suppressed. When $R5/((N3-1)\cdot f)$ is higher than the lower limit, the negative refractive power of the object side surface of the third lens is maintained. Therefore, a positive Petzval's sum is lowered, the axial chromatic aberration and the lateral chromatic aberration can be preferably corrected in addition to the correction of the curvature of the image surface.

The conditional formula (8) indicates a condition for appropriately setting the positive refractive power of the air lens formed between the image side surface of the third lens and the object side surface of the fourth lens. The focal length fa of the air lens can be calculated according to a formula:

$$fa=R6\cdot R7/\{R7\cdot(1-N3)+R6\cdot(N4-1)-D6\cdot(1-N3)\cdot(N4-1)\},$$

where N3 denotes the refractive index of the third lens at the d-line, N4 denotes a refractive index of the fourth lens at the d-line, R6 denotes a curvature radius of the image side surface of the third lens, R7 denotes a curvature radius of the object side surface of the fourth lens, and D6 denotes an interval of an air space on the optical axis between the third and fourth lenses.

When the conditional formula (8) is satisfied, the curvature of the image surface and the distortion can be corrected, and the telecentric characteristic of the light flux on the image side can be maintained.

Further preferably, in place of the conditional formula (8), a following conditional formula (9) is satisfied:

$$-0.40<R5/((N3-1)\cdot f)<-0.25 \qquad (9).$$

Preferably, an image side surface of the fourth lens satisfies a following conditional formula (10):

$$X-X0<0 \qquad (10)$$

for a displacement value X of an aspherical surface expressed in the formula (11):

$$X = \frac{h^2/R8}{1+\sqrt{1-(1+K8)h^2/R8^2}} + \sum A_i h^i \qquad (11)$$

and a displacement value X0 of a rotational quadratic surface component of the aspherical surface expressed in the formula (12):

$$X0 = \frac{h^2/R8}{1+\sqrt{1-(1+K8)h^2/R8^2}} \qquad (12)$$

in a range of h satisfying hmax X 0.5<h<hmax, where a vertex of the image side surface of the fourth lens is set as an origin, a direction of an optical axis is set as an X-axis, h denotes a height in an arbitrary direction perpendicular to the optical axis, Ai denotes an i-th order coefficient of the aspherical surface for the image side surface of the fourth lens, hmax denotes a maximum effective radius, R8 denotes a curvature radius of the image side surface of the fourth lens, and K8 denotes a conic constant for the image side surface of the fourth lens.

Here, the vertex of the image side surface denotes the intersection of the surface and the optical axis.

Generally, a plurality of lenses combined with each other are used. When the total lens length is shortened, a back focal length is shortened. Therefore, it is difficult to obtain the telecentric characteristic of the light flux on the image side. In the present invention, the image side surface of the fourth lens and nearest to the image side among the surfaces of the lenses is formed in the aspherical surface shape satisfying the formulas (10), (11) and (12). Therefore, the telecentric characteristic particularly for the light flux at the high angle of view can be maintained.

Preferably, the first lens is formed out of glass material, and the second, third and fourth lenses are formed out of plastic material.

The term "formed out of plastic material" includes that the coating processing is performed on the surface of a substance including the plastic material as base material for the purpose of the anti-reflection or the improvement of surface hardness. This definition is available for following all description.

Plastic lenses made by the injection molding are used as the lenses composing the image pickup lens, the miniaturized lightweight image pickup lens is advantageously obtained at low cost. However, the refractive index of the plastic material considerably changes with the temperature. Therefore, assuming that plastic lenses are used for all lenses of the image pickup lens, a problem has arisen that the position of an image point of the whole image pickup lens changes with the temperature.

The configuration of the present invention uses many plastic lenses and compensates the change of the position of the image point of the whole image pickup lens caused by the temperature change. That is, the first positive lens is formed out of the glass material of which the refractive index hardly changes with the temperature, and the second, third and fourth lenses are formed out of the plastic material. The second lens has the comparatively strong positive refractive power, and the third lens has the comparatively strong negative refractive power. Therefore, the influence of the second lens on the position of the image point changing with the temperature cancels out that of the third lens, and the positional change of the image point in the whole image pickup lens caused by the temperature change can be suppressed to a low degree.

Preferably, a following conditional formula (13) is satisfied:

$$|f/f234|<0.7 \qquad (13),$$

where f234 denotes a combined focal length of the second, third and fourth lenses, and f denotes a focal length of the whole image pickup lens.

The conditional formula (13) prescribes the combined focal length of the lenses formed out of the plastic material. Because the positional change of the image point of a plastic lens caused by the temperature change depends on a degree of the refractive power of the lens, the combined focal length of the first, second and third lenses formed out of the plastic material is set to a large value to suppress a sum of values of the refractive power of the lenses to a low value. Therefore, the positional change of the image point caused by the temperature change can be suppressed to a low degree.

Preferably, a saturated water absorption rate of the plastic material is not more than 0.7%.

Because the saturated water absorption rate of the plastic material is larger than that of the glass material, a non-uniform distribution of absorbed water occurs in the plastic lens due to a rapid change of humidity. Therefore, the refractive index of the plastic lens cannot be uniformly set, and a preferable image forming performance cannot be obtained. In the present invention, the lenses are formed out of the plastic material having a low saturated water absorption rate, and the deterioration of the performance caused by the change of humidity is reduced.

In accordance with the second aspect of the present invention, an image pickup lens comprising four lenses arranged in an order of a first lens, a second lens, a third lens and a fourth lens from an object side, wherein the first lens has positive refractive power and has a convex surface facing toward the object side, one lens or two lenses selected from the second, third and fourth lenses have the positive refractive power, at least one lens of the positive refractive power selected from the first, second, third and fourth lenses is formed out of glass material, another lens of the positive refractive power and one lens of negative refractive power selected from the first, second, third and fourth lenses are formed out of plastic material, and an image side surface of the fourth lens satisfies a following conditional formula (14):

$$X-X0<0 \qquad (14)$$

for a displacement value X of an aspherical surface expressed in the formula (15):

$$X = \frac{h^2/R8}{1+\sqrt{1-(1+K8)h^2/R8^2}} + \sum A_i h^i \qquad (15)$$

and a displacement value X0 of a rotational quadratic surface component of the aspherical surface expressed in the formula (16):

$$X0 = \frac{h^2/R8}{1+\sqrt{1-(1+K8)h^2/R8^2}} \qquad (16)$$

in a range of h satisfying hmax X 0.5<h<hmax, where a vertex of the image side surface of the fourth lens facing is set as an origin, a direction of an optical axis is set as an X-axis, h denotes a height in an arbitrary direction perpendicular to the optical axis, Ai denotes an i-th order coefficient of the aspherical surface for the image side surface of the fourth lens, hmax denotes a maximum effective radius, R8 denotes a curvature radius of the image side surface of the fourth lens, and K8 denotes a conic constant for the image side surface of the fourth lens.

Here, the vertex of the image side surface denotes the intersection of the surface and the optical axis.

In the above configuration, four lenses are arranged in an order of the first, second, third and fourth lenses. In use, the first lens is placed on the object side, and the fourth lens is placed on the image side. In this use condition, the first positive lens having the convex surface facing toward the image side and nearest to the object side is arranged. Therefore, as compared with the configuration having the first lens of a negative refractive power, the configuration advantageous to shorten the total lens length can be obtained.

Also, in the configuration of the present invention, lenses selected from the first, second, third and fourth lenses are formed out of the plastic material. As described above, though the plastic lens is advantageous to make a miniaturized lightweight image pickup lens at low cost, the plastic lens has a fault that the position of an image point of the lens considerably changes due to a large change of the refractive index of the lens caused by the temperature change.

Therefore, the configuration of the present invention uses many plastic lenses and compensates the change of the position of the image point of the whole image pickup lens caused by the temperature change. In the present invention, one positive lens is formed out of the glass material of which the refractive index hardly changes with the temperature, and two lenses including at least one positive lens and at least one negative lens are formed out of the plastic material. Therefore, the large positive refractive power can be distributed to the glass lens and the plastic lenses. Also, because the plastic lenses include the positive lens and the negative lens of the comparatively strong refractive power, the influence of the positive lens on the positional change of the image point caused by the temperature change cancels out that of the negative lens, and the positional change of the image point in the whole image pickup lens caused by the temperature change can be suppressed to a low degree.

Also, in the configuration of the present invention, the image side surface of the fourth lens is formed in the aspherical surface shape satisfying the formulas (14), (15) and (16). Therefore, the telecentric characteristic particularly for the light flux at the high angle of view can be maintained.

Preferably, the lenses other than the lens having the positive refractive power and formed out of the glass material are formed out of the plastic material.

In the above configuration, only one lens having the positive refractive power is formed out of the glass material, and the other three lenses are formed out of the plastic material. Therefore, many plastic lenses are used. Accordingly, the advantage of forming the lenses out of the plastic material can be effectively obtained.

Preferably, the first lens is formed out of the glass material.

In the above configuration, the first lens placed nearest to the object side and damaged most easily due to external causes is not formed out of the easily damaged plastic material but formed out of the glass material. Therefore, the generation of flaws of the first lens can be reduced, and the first lens protects the other lenses formed out of the plastic material.

Preferably, a following conditional formula (17) is satisfied:

$$|f/f234|<0.7 \tag{17},$$

where f234 denotes a combined focal length of the second, third and fourth lenses, and f denotes a focal length of the whole image pickup lens.

As described for the formula (9), the conditional formula (13) prescribes the combined focal length of the lenses formed out of the plastic material. Therefore, the combined focal length of the second, third and fourth lenses formed out of the plastic material is set to a high value according to the conditional formula (13) to suppress a sum of values of the refractive power of the lenses to a low value, and the positional change of the image point caused by the temperature change can be suppressed to a low degree.

Preferably, a saturated water absorption rate of the plastic material is not more than 0.7%.

Plastic having a low saturated water absorption rate is used as the lens material. Therefore, the performance of the plastic lenses does not deteriorate regardless of the change of humidity.

Preferably, following conditional formulas (18), (19) and (20) are satisfied:

$$L/2Y<1.60 \tag{18}$$

$$0.40<f12/f<0.70 \tag{19}$$

$$25<\nu P-\nu N \tag{20},$$

where L denotes a distance on an optical axis from the object side surface of the first lens to an image side focal point of the whole image pickup lens, 2Y denotes the length of a diagonal line on an effective image screen, f12 denotes a combined focal length of the first lens and the second lens, f denotes a focal length of the whole image pickup lens, $\nu P$ denotes an Abbe number of the lens having the strongest positive refractive power, $\nu N$ denotes an Abbe number of the lens having the strongest negative refractive power.

The conditional formulas (18), (19) and (20) indicate conditions for obtaining a miniaturized image pickup lens in which the aberration is preferably corrected.

In the same manner as the formula (1), the conditional formula (18) indicates a condition for achieving the shortening of the total lens length.

Also, in the same manner as the formula (2), the conditional formula (19) indicates a condition for appropriately setting the combined focal length of the first lens and the second lens. When f12/f is set to be higher than the lower limit, the generation of both the high-order spherical aberration and the coma can be suppressed. Also, when f12/f is set to be lower than the upper limit, the total lens length can be shortened.

Also, the conditional formula (20) indicates a condition for prescribing the Abbe number of the positive lens having the strongest positive refractive power and the Abbe number of the negative lens having the strongest negative refractive power to preferably correct the chromatic aberration. When $\nu P-\nu N$ is set to be higher than the lower limit, the axial chromatic aberration and the lateral chromatic aberration can be corrected in good balance.

Preferably, the second lens has the positive refractive power, and the third lens has the negative refractive power.

In the above configuration, because the positive lenses and the negative lens having the comparatively strong refractive power are arranged in that order from the object side, the total lens length can be easily shortened.

In accordance with the third aspect of the present invention, an image pickup unit comprises:

a solid-state image pickup element having a photoelectric transfer unit;

an image pickup lens for forming an image of an object in the photoelectric transfer unit of the solid-state image pickup element;

a substrate for holding the solid-state image pickup element, the substrate comprising an external connection terminal through which an electric signal is transmitted or received; and a casing made of a light shielding substance and comprising an opening for incident light entering an object side, wherein the solid-state image pickup element, the image pickup lens, the substrate and the casing are combined with each other, a length of the image pickup unit in a direction of an optical axis of the image pickup lens is not more than 15 mm, the image pickup lens comprises four lenses arranged in an order from the object side, and the lens arranged nearest to the object side has the positive refractive power.

The "opening for incident light" is not limited to a space forming means such as a hole and indicates a means for forming an area through which incident light entering the object side can be transmitted. This definition is available for the fourth aspect of the present invention described later.

The image pickup unit having the configuration described above satisfies a request of the miniaturization and the lightening-in-weight and is used to be mounted on a small-sized portable electronic device. In this unit, the lens arranged nearest to the object side is set to a positive lens, and the structure advantageous for the shortening of the total lens length is adopted. The image pickup lens comprises four lenses while shortening the length of the whole image pickup unit in the direction of the optical axis.

The description "the length of the image pickup unit in the direction of the optical axis is not more than 15 mm" denotes a total length of the image pickup unit having all the above-described elements along the direction of the optical axis. For example, when the casing is placed on a front surface of the substrate and electronic parts are arranged on a back surface of the substrate, a distance from an end portion of the casing on the object side to an end portion of the electronic parts projecting from the back surface of the substrate is not more than 15 mm. This definition is available for the fourth aspect of the present invention.

It is preferred that many lenses are arranged in the image pickup lens to correct various types aberration and improve the telecentric characteristic of the solid-state image pickup element and the quality of the formed image. However, the number of lenses of the image pickup unit mounted on a small-sized electronic device is generally three at most. Because four lenses are used for the image pickup unit of the present invention, the configuration of the present invention is advantageous for the improvement of the image quality.

Also, when the image pickup unit is miniaturized, the miniaturization of the lenses composing the image pickup lens is required, and the curvature radius of each lens necessarily becomes small. However, as the curvature radius is smaller, the difficulty in the keeping of the manufacturing precision of the lens is increased. In the present invention, because the image pickup lens comprises four lenses, the refractive power is distributed to the lenses, and a degree of the requirement for lowering the curvature radius of each lens can be reduced. Therefore, the manufacturing precision of the lens can be easily kept well, and the structure of the image pickup unit is advantageous for the improvement of the image quality.

Also, to lighten the whole image pickup unit, it is better to form each lens of the image pickup lens out of the plastic material in place of the glass material and to increase the number of plastic lenses.

However, the change of the refractive index of the plastic material caused by the temperature change is large. Therefore, when all lenses of the image pickup lens are formed of the plastic material, a problem has arisen that the position of the image point of the whole image pickup lens changes with the temperature. This positional change of the image point causes a problem particularly in an image pickup device (so-called pan-focus type image pickup device) on which a solid-state image pickup element having pixels densely arranged is mounted without having an auto-focus mechanism. Because a pixel pitch in the solid-state image pickup element having high dense pixels is small, a focal depth proportional to the pixel pitch becomes small, and an allowance width for the positional change of the image point becomes narrow. Also, the pan-focus type image pickup device is focused on an object spaced from the device by tens cm denoting a referential distance, and an image of an object spaced from the device by a distance ranging from an infinite distance to a very short distance near to zero is formed according to the depth of field. Therefore, the image of the object spaced by the infinite distance or the very short distance is slightly out of focus as compared with that spaced by the referential distance. When the position of the image point is changed due to the temperature change, a problem has arisen that the quality of the image of the object spaced by the infinite distance or the very short distance is extremely degraded.

To solve this problem, it is preferred that at least one lens is set to a glass lens and two lenses or more including at least one positive lens and at least one negative lens are set to plastic lenses. Thereby, a sum of values of the refractive power of the plastic lenses can be suppressed to a low value while maintaining the positive refractive power of the whole image pickup lens, and the influence of the positive lens on the positional change of the image point caused by the temperature change can cancel out that of the negative lens. To obtain the structure of the image pickup lens described above, when a degree of the design freedom is considered, the triplet lens structure is not adequate, and the image pickup lens having a quadruplet lens structure is required. Here, assuming that the image pickup lens has five lenses (quintuplet lens structure) or more, a large-sized image pickup unit is inevitably obtained. Therefore, the structure of five lenses or more is not adequate.

In accordance with the fourth aspect of the present invention, an image pickup unit comprises:

an image pickup lens having a photoelectric transfer unit;

one image pickup lens described above for forming an image of an object in the photoelectric transfer unit of the solid-state image pickup element;

a substrate for holding the solid-state image pickup element, the substrate comprising an external connection terminal through which an electric signal is transmitted or received; and a casing made of a light shielding substance and comprising an opening for incident light entering an object side, wherein the solid-state image pickup element, the image pickup lens, the substrate and the casing are combined with each other, and a length of the image pickup unit in a direction of an optical axis of the image pickup lens is not more than 15 mm.

In the above configuration, each image pickup lens described above is mounted on the image pickup unit. Therefore, the image pickup unit having effects of the miniaturization, the lightening-in-weight and the high image quality can be actualized.

In accordance with the fifth aspect of the present invention, a portable terminal comprises the image pickup unit described above.

In the above configuration, the image pickup unit described above is mounted on the portable terminal.

Therefore, the portable terminal having effects of the miniaturization, the lightening-in-weight and the high image quality can be actualized.

BRIEF DESCRIPTION OF THE DRAWINGS

The present invention will become more fully understood from the detailed description given hereinbelow and the accompanying drawing which are given by way of illustration only, and thus are not intended as a definition of the limits of the present invention, and wherein;

FIG. 6A shows spherical aberration, FIG. 6B shows astigmatism, FIG. 6C shows distortion, and FIGS. 6D and 6E show meridional coma;

FIG. 7A shows spherical aberration, FIG. 7B shows astigmatism, FIG. 7C shows distortion, and FIGS. 7D and 7E show meridional coma;

FIG. 9A shows spherical aberration, FIG. 9B shows astigmatism, FIG. 9C shows distortion, and FIGS. 9D and 9E show meridional coma;

FIGS. 11A to 11E are views of various types aberration according to Example 4, FIG. 11A shows spherical aberration, FIG. 11B shows astigmatism, FIG. 11C shows distortion, and FIGS. 11D and 11E show meridional coma.

PREFERRED EMBODIMENTS OF THE INVENTION

Figure 1:
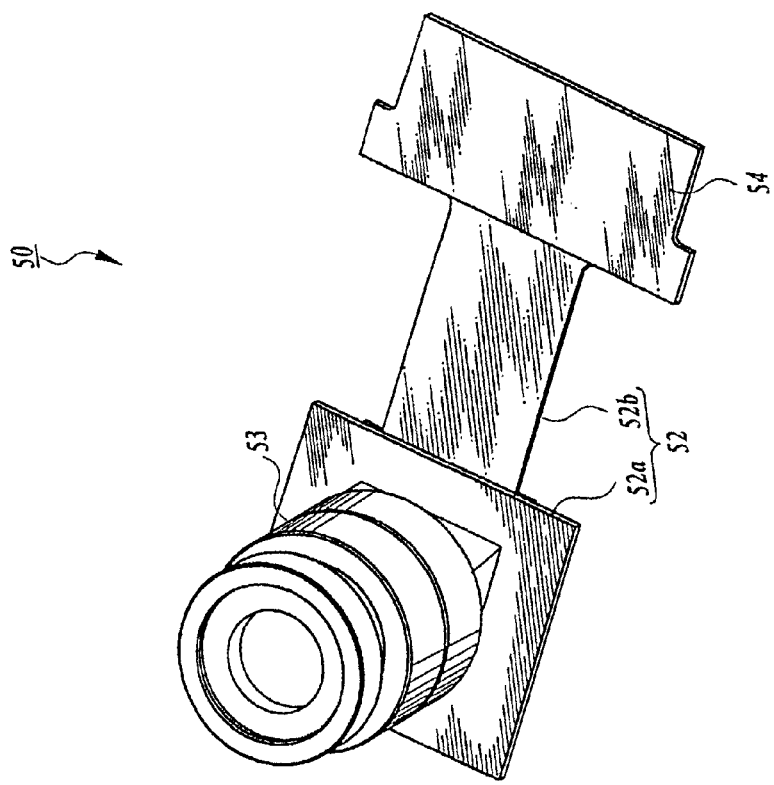
FIG. 1 is a perspective view of an image pickup unit according to an embodiment of the present invention.
Figure 2:
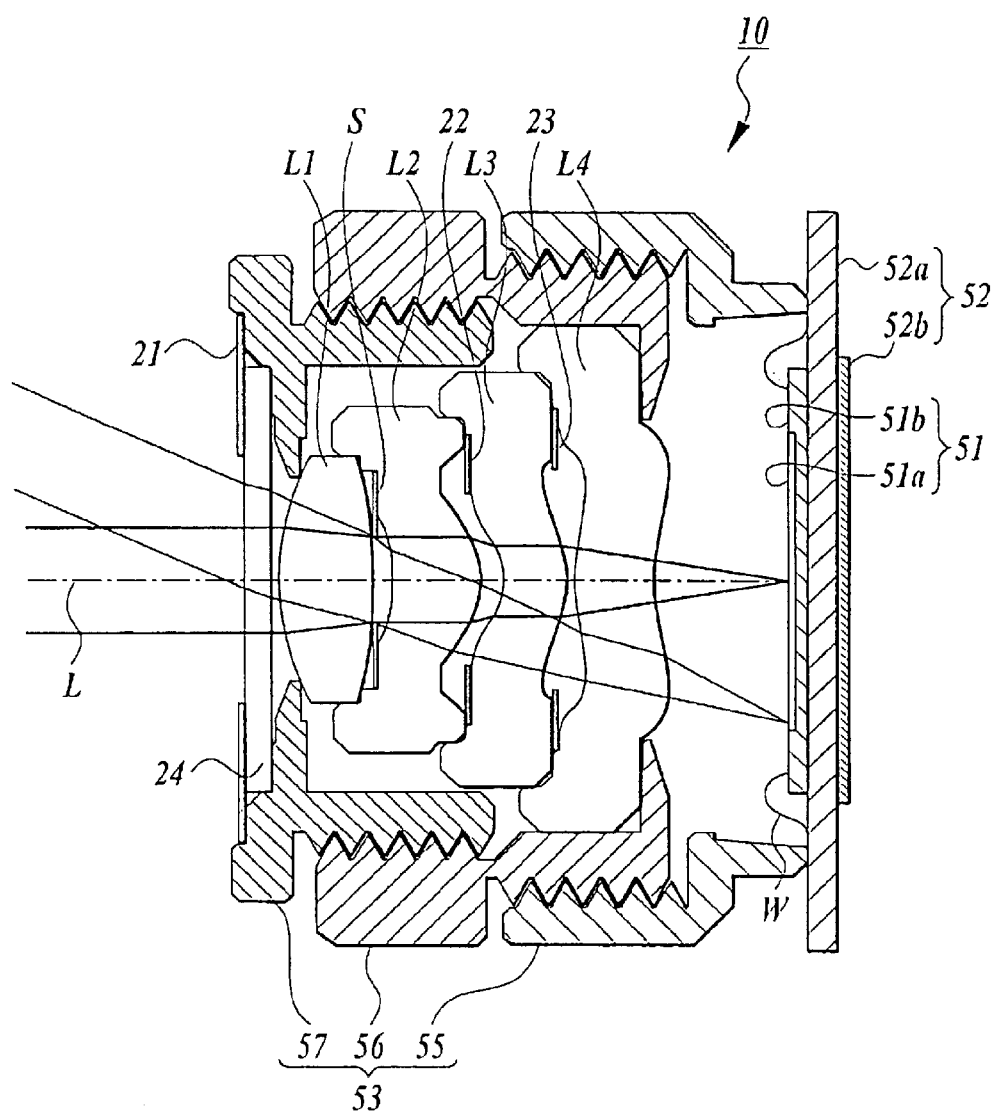
FIG. 2 is a sectional view taken along a section including an optical axis of lenses of an image pickup lens.

Hereinafter, the embodiment of the present invention will be explained with reference to the FIGS. 1 and 2. FIG. 1 is a perspective view of an image pickup unit 50 according to the embodiment, and FIG. 2 is a sectional view taken along an optical axis of an image pickup system of the image pickup unit 50.

The image pickup unit 50 comprises a CMOS type image sensor 51 having a photoelectric transfer unit 51a and functioning as a solid-state image pickup element, an image pickup optical system 10 for forming an image of an object on the photoelectric transfer unit 51a of the image sensor 51, a base plate 52 for holding the image sensor 51, comprising an external connection terminal 54 which receives or transmits an electric signal from/to the image sensor 51, and a casing 53 made of a light shielding substance to function as a lens barrel and comprising an opening for incident light entering an object side. These constitutional elements of the image pickup unit 50 are combined with each other.

In the image sensor 51, the photoelectric transfer unit 51a having pixels (photoelectric transfer element) arranged in two dimensions in a central portion of a plane on a light receiving side is arranged, and a signal processing circuit 51b is arranged around the photoelectric transfer unit 51a. The signal processing circuit 51b comprises an actuating circuit unit for actuating the pixels one after another to obtain a signal charge from each pixel, an A/D converting unit for converting each signal charge to a digital signal, and a signal processing unit for producing an image output signal from the digital signals. Also, a large number of pads (not shown) are arranged in the neighborhood of the periphery of the plane of the image sensor 51 on the light receiving side, and each pad is connected to the base plate 52 through a wire W. The image sensor 51 converts each signal charge of the photoelectric transfer unit 51a to an image signal such as a digital YUV signal and outputs the image signal to a prescribed circuit placed on the base plate 52 through the wire W. Here, Y denotes a luminance signal, U (=R−Y) denotes a color difference signal indicating the difference between red and the luminance signal, and V (=B−Y) denotes a color difference signal indicating the difference between blue and the luminance signal.

The solid-state image pickup element is not limited to the CMOS type image sensor, and it is preferable that another element such as CCD be used as the solid-state image pickup element.

The base plate 52 comprises a support flat plate 52a for supporting the image sensor 51 and the casing 53 on its front surface, and a flexible base plate 52b of which one end portion is connected to a back surface (a surface opposite to the front surface) of the support flat plate 52a.

The support flat plate 52a has a large number of signal transmission pads located on the front and back surfaces. Each pad is connected to the wire W of the image sensor 51 on the front surface and is connected to the flexible base plate 52b on the back surface.

The one end portion of the flexible base plate 52b is, as described above, connected to the support flat plate 52a, and the flexible base plate 52b connects the support flat plate 52a and an external circuit (for example, a control circuit of a host processor having an image pickup unit) through the external connection terminal 54 arranged in the other end portion thereof. Therefore, the image pickup unit 50 can receive a voltage or clock signal supplied from the external circuit to actuate the image sensor 51. Also, the image pickup unit 50 can output the digital YUV signal to the external circuit. Further, a middle portion of the flexible base plate 52b in the longitudinal direction thereof has flexibility and deformation performance, and the deformation of the middle portion gives a degree of freedom to the direction and arrangement of the external connection terminal 54 with respect to the support flat plate 52a.

Next, the casing 53 and the image pickup optical system 10 will be described below. The image sensor 51 glues onto the front surface of the support flat plane 52a while being arranged within the casing 53, so that the image sensor 51 is fixed to the support flat plane 52a. The image pickup optical system 10 is arranged and held within/by the casing 53.

As shown in FIG. 2, the image pickup optical system 10 comprises an IR (infrared ray) cut filter 24 for preventing infrared rays from being incident on the system 10, and an image pickup lens which comprises a first lens L1, a stop S, a second lens L2, a third lens L3 and a fourth lens L4 supported and arranged by/in the casing 53 in that order from the object side. The image pickup optical system 10 transmits an image of an object through the lenses L1, L2, L3 and L4 and performs the image formation in the photoelectric transfer unit 51a of the image sensor 51. Here, in FIG. 2, the left side denotes the object side, and the right side denotes the image side, and a dot-dash-line denotes an optical axis L common to the lenses L1, L2, L3 and L4.

The IR cut filter 24 is made of a substance having an infrared ray absorption characteristic and is glued onto an object side surface of the casing 53.

Also, the stop S has a function for determining an F number of the whole image pickup lens.

The casing 53 comprises a base body 55 directly fixed to the base plate 52, a lens holder 56 holding the fourth lens L4, and a lens fixture 57 fixing and holding all the lenses L1, L2, L3 and L4 in cooperation with the lens holder 56. The lens fixture 57, the lens holder 56 and the base body 55 are integrally connected to each other to form in an almost cylindrical shape, and are set to place those center lines on the same axis.

In the image formation, the lens fixture 57, the lens holder 56 and the base body 55 are arranged in that order from the object side and are respectively formed in the almost cylindrical shape. The base body 55 has the largest inner diameter and places the lens holder 56 within the base body 55. The base body 55 has a female screw on its inner circumferential surface, and the lens holder 56 has a male screw on its outer circumferential surface. These screws gear to each other to connect the base body 55 and the lens holder 56. The lens holder 56 has an inner diameter larger than that of the lens fixture 57 and places the lens fixture 57 within the lens holder 56. The lens holder 56 has a female screw on its inner circumferential surface, and the lens fixture 57 has a male screw on its outer circumferential surface. These screws gear to each other to connect the lens holder 56 and the lens fixture 57.

Next, the lenses L1 to L4 will be described below.

In the Japanese Patent Application No. 2002-083880 of which the applicant is the same as that of this application, all lenses are formed out of plastic lenses, so that the high performance and the mass productivity of the lenses can be obtained. However, the refractive index of the plastic lens changes with temperature, so that a problem has arisen that an image point is considerably changed. Also, a small-sized image pickup device having a small-sized image pickup lens is usually operated according to a pan-focus method in which no lens focusing mechanism is used. Therefore, when a solid-state image pickup element having high image quality is used, the influence of the temperature change cannot be disregarded.

Therefore, in this embodiment, the lens L1 is formed out of the glass material, and the lenses L2 to L4 are formed out of the plastic material. The lenses L1 to L4 will be described later in detail.

In recent years, to miniaturize the image pickup device without changing the number of pixels of the solid-state image pickup element, a small-sized image pickup device having the pixels of a shortened pixel pitch and a light receiving unit (photoelectric transfer unit) of a small image screen size determined by the shortened pixel pitch has been developed. In the image pickup lens used for the solid-state image pickup element of the small image screen size, to obtain the same angle of view as that in an image pickup lens corresponding to a normal image screen size, it is required to shorten a focal length of the image pickup lens. Therefore, a curvature radius and an outer diameter in each lens are considerably shortened. As a result, it is difficult to form the lens out of glass by polishing, and each lens L2 to L4 is formed out of plastic by the injection molding.

Also, because each lens L2 to L4 is formed by the injection molding, each lens can have a flange portion in the periphery thereof. The fourth lens L4 has a flange portion having the largest outer diameter among those of the lenses, and a concave portion is formed on a plane of the flange portion on the object side. A flange portion of the third lens L3 is tightly fitted into the concave portion of the fourth lens L4. Here, the concave portion is formed so as to make the optical axis of the fourth lens L4 agree with that of the third lens L3.

The third lens L3 has a flange portion of an outer diameter larger than that of the second lens L2, and a concave portion is formed on a plane of the flange portion on the object side. A flange portion of the second lens L2 is tightly fitted into the concave portion of the third lens L3. Here, the concave portion is formed so as to make the optical axis of the third lens L3 agree with that of the second lens L2.

The second lens L2 has a flange portion of an outer diameter larger than that of the first lens L1, and a concave portion is formed on a plane of the flange portion on the object side. The first lens L1 is tightly fitted into the concave portion of the second lens L2. Here, the concave portion is formed so as to make the optical axis of the second lens L2 agree with that of the first lens L1.

Therefore, when the lenses L1 to L4 are piled up through the flange portions, the optical axes of the lenses L1 to L4 can agree with each other.

Also, because the positional precision of the concave portion and a convex portion of each lens L1 to L4 in the axial direction can be set to that possible in the injection molding, an interval of each pair of lens in the optical axial direction can be maintained with a prescribed precision. Therefore, an assembly precision of the optical system 10 can be improved. Further, the lenses can be easily assembled, and the productivity is increased.

On the conditions of the lenses L1 to L4 described above, the description of the casing 53 is restarted.

The lens holder 56 of the casing 53 has an end portion projecting on the image side to form the lens holder 56 in a cylindrical shape with a bottom. A central portion of the bottom has a large opening, and external light passes through the opening. The lens fixture 57 has an end portion projecting on the object side to form the lens fixture 57 in a cylindrical shape with a bottom. A central portion of the bottom has a large opening, and external light passes through the opening. An inner diameter of the lens holder 56 is set to be equal to an outer diameter of the fourth lens L4. When the fourth lens L4 is fitted to the lens holder 56, the fourth lens L4 can be positioned so as to make the optical axis of the fourth lens L4 agree with a center line of the lens holder 56. Thereafter, as described above, when the lens fixture 57 is attached to the lens holder 56 on condition that the lenses L1 to L4 are piled up, each of the lenses L1 to L4 piled up is fitted and held to/on a bottom face of the adjacent lens or the lens holder 56, and the center lines of the base body 55, the lens holder 56 and the lens fixture 57 and the optical axes of the lenses L1 to L4 can agree with the same axis. Here, the casing 53 is fixed to the base plate 52 so as to make the center lines of the lens holder 56 and the like agree with the center of the photoelectric transfer plane 51a of the image sensor 51. Also, the casing 53 supports the fourth lens L4 on an inner circumferential surface and an inner bottom surface of the lens holder 56 and supports only the periphery of the first lens L1 on only an inner bottom surface of the lens fixture 57. No inner circumferential portions of the lens fixture 57 contact with each lens L1 to L4.

Also, because center lines of screws of the base body 55 and the lens holder 56 agree with the optical axis L of the lens L1 to L4, the positions of the lens L1 to L4 relative to the image sensor 51 can be adjusted while rotating the lens holder 56 so as to set the focusing condition to the best one. Here, after adjusting the positions of the lens L1 to L4, the base body 55 and the lens holder 56 are fixed to each other by using an adhesive.

Also, a first shielding mask 21 is arranged on an end plane of the casing 53 on the object side, a second shielding mask 22 is arranged between the second lens L2 and the third lens L3, and a third shielding mask 23 is arranged between the third lens L3 and the fourth lens L4. Each shielding mask 21 to 23 has a circular opening and is placed to cut off unnecessary light not contributing to the image formation.

Each shielding mask 21 to 23 is made of a disk-shaped light shielding substance and has a circular hole of a prescribed inner diameter at the center of the disk-shaped substance. Center lines of the holes of the masks 21 to 23 agree with the optical axis L of the lenses L1 to L4.

As described above, the first shielding mask 21 is arranged on the end plane of the casing 53 on the object side. The second shielding mask 22 is arranged in a concave portion of the third lens L3 and is put and held between the second and third lenses L2 and L3. The third shielding mask 23 is arranged in a concave portion of the fourth lens L4 and is put and held between the third and fourth lenses L3 and L4.

Here, each of the third and fourth lenses L3 and L4 has a cavity in the concave portion to arrange the shielding mask 22 or 23. When the lenses L2 to L4 are tightly fitted to the casing 53, the shielding masks 22 and 23 exert no influence on the distance between the lenses L2 and L3 and the distance between the lenses L3 and L4.

Mutual actions of the stop S and the shielding masks 21 to 23 prevent light entering the object side from being incident on areas out of lens effective diameters of the lenses L1 to L4, and the generation of ghost or flare can be suppressed.

Figures 3A, 3B:
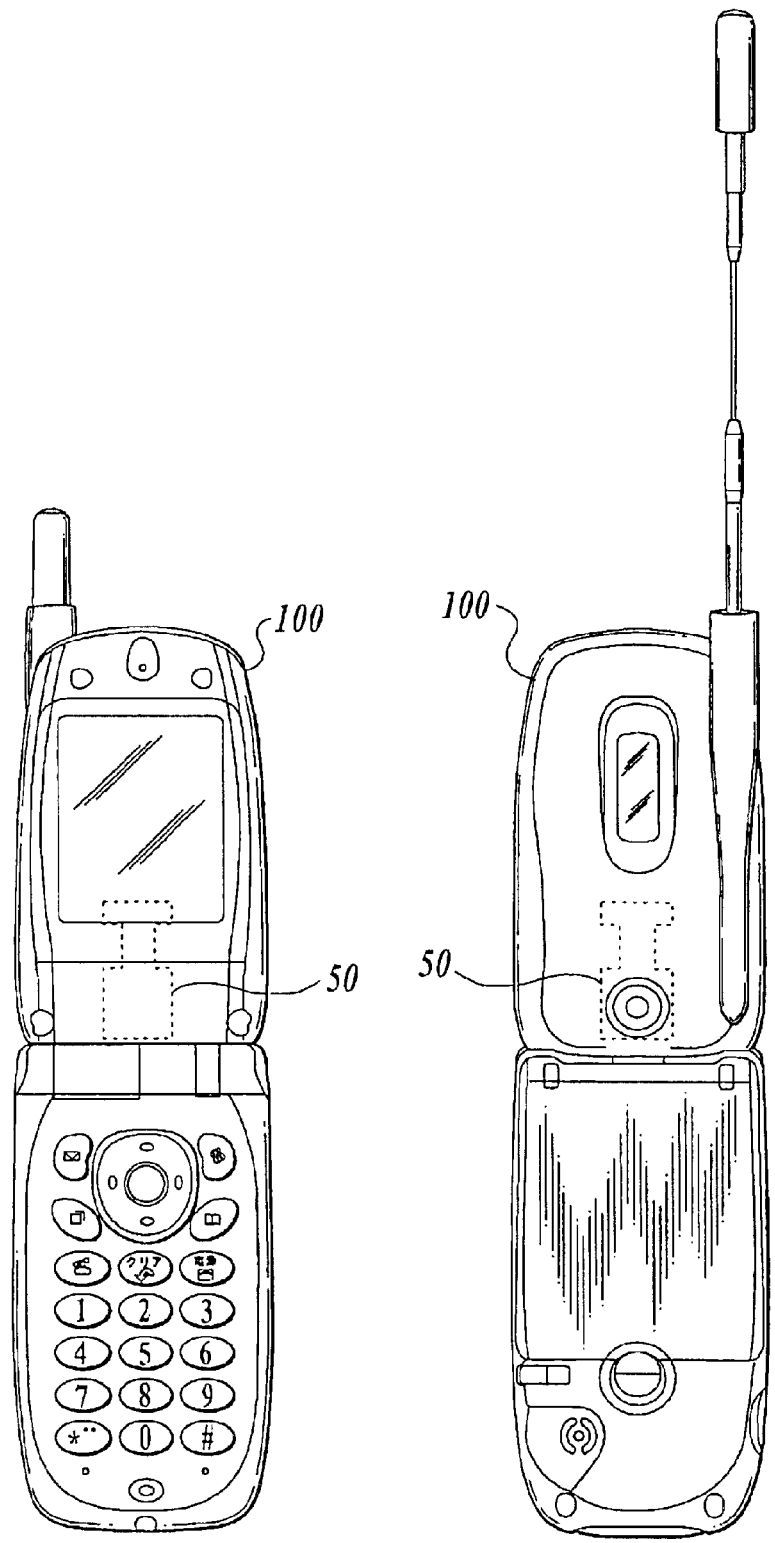
FIG. 3A is a front view of a portable telephone to which the image pickup unit is applied.
FIG. 3B is a back view of the portable telephone to which the image pickup unit is applied.

An example of the use of the image pickup unit 50 will be described. FIGS. 3A and 3B show a portable telephone 100 functioning as a portable terminal which is equipped with the image pickup unit 50, and FIG. 4 is a control block diagram of the portable telephone 100.

The image pickup unit 50 is, for example, arranged in the portable telephone 100 having a liquid crystal display on a front side so as to place the object side end plane of the casing 53 of the image pickup optical system 10 on a back side of the portable telephone 100. Also, the image pickup unit 50 is arranged under the liquid crystal display.

The external connection terminal 54 of the image pickup unit 50 is connected to a control unit 101 of the portable telephone 100 and outputs an image signal such as a luminance signal and a color difference signal to the control unit 101.

Figure 4:
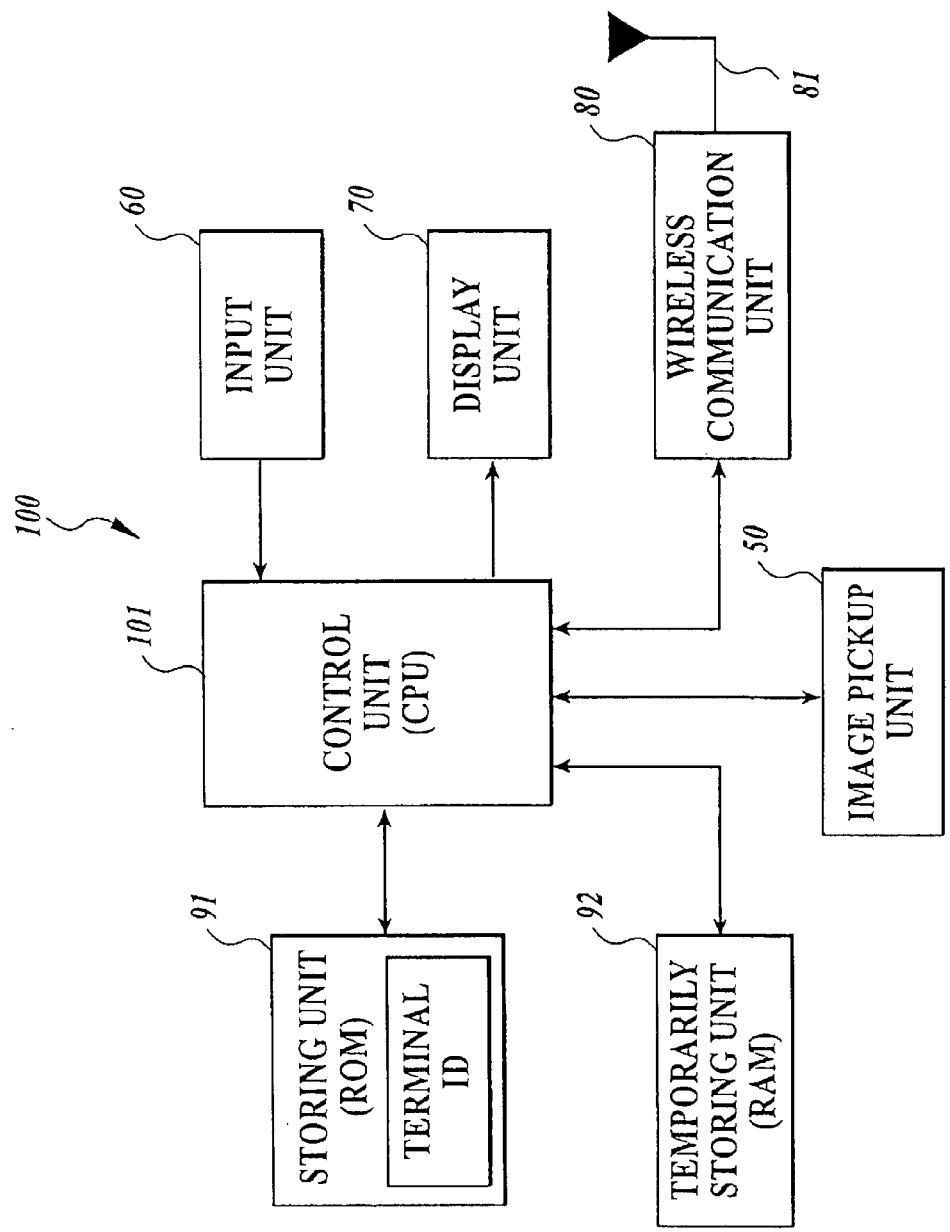
FIG. 4 is a control block diagram of the portable telephone shown in FIGS. 3A and 3B.

As shown in FIG. 4, the portable telephone 100 comprises the control unit (CPU) 101 for executing a program corresponding to each type of processing, an input unit 60 for receiving a number instructed by using a key, a display unit 70 for displaying prescribed data and a formed image, a wireless communication unit 80 for performing various types of information communication with an external server, a storing unit (ROM) 91 for storing a system program of the portable telephone 100, various types of processing programs and necessary data such as a terminal ID, and a temporarily storing unit (RAM) 92, used as a work area, for temporarily storing the various types of processing programs and data executed or used by the control unit 101, data processed by the control unit 101 and image data obtained in the image pickup unit 50.

An image signal received from the image pickup unit 50 is stored in the storing unit 92, displayed on the display unit 70 and/or transmitted as image information to the outside through the wireless communication unit 80 under control of the control unit 101.

EXAMPLE

Next, specifications of the image pickup lens will be described below according to Examples 1, 2, 3 and 4. Here, specifications of the image pickup lens are not limited to Examples. Symbols used in Examples denote as follows.

f: focal length of the whole image pickup lens fB: back focal length

F: F number

2Y: length of diagonal line on effective image screen (length of diagonal line of rectangular shaped light receiving plane of solid-state image pickup element)

R: curvature radius of refractive surface

D: interval between refractive surfaces on axis

Nd: refractive index of lens material at d-line vd: Abbe number of lens material Also, in Examples, the shape of an aspherical surface is expressed in a rectangular coordinate system, which has a vertex of the surface set as an origin and an optical axial direction set as an X axis, according to a following formula by using R denoting a curvature radius of the aspherical surface at the vertex, K denoting a conic constant, and A4, A6, A8, A10 and A12 denoting coefficients of the aspherical surface.

$$X = \frac{h^2/R}{1 + \sqrt{1 - (1+K)h^2/R^2}} + A_4 h^4 + A_6 h^6 + A_8 h^8 + A_{10} h^{10} + A_{12} h^{12},$$

where $$h = \sqrt{Y^2 + Z^2}$$

is satisfied

Figure 5:
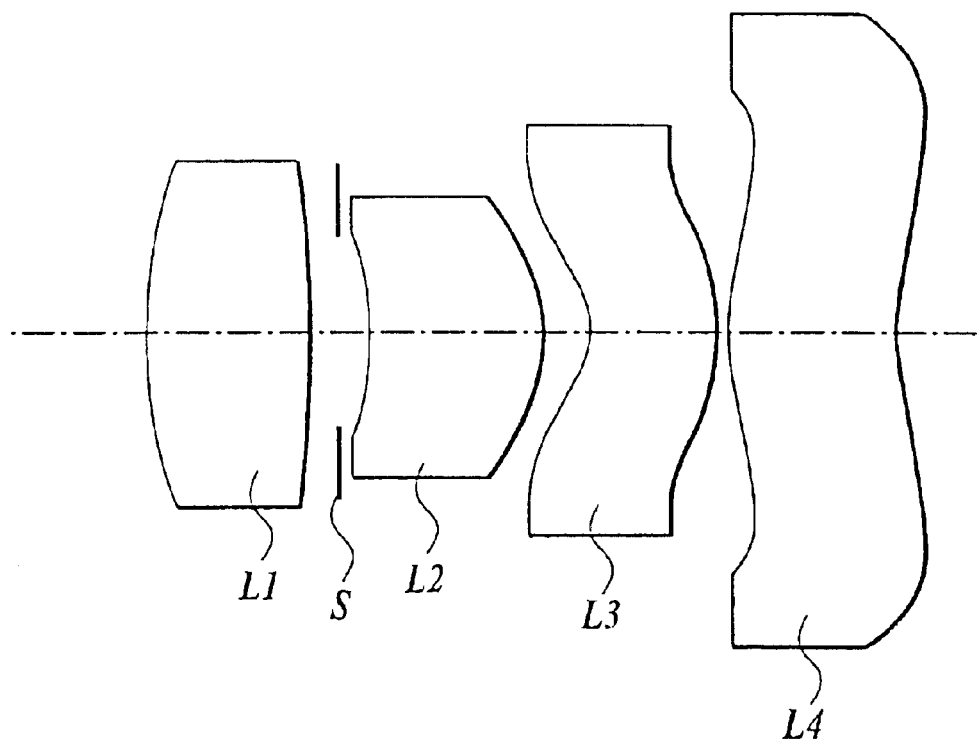
FIG. 5 is a representative sectional view of a small-sized image pickup lens according to Examples 1 and 2 of the present invention.

FIG. 5 a representative sectional view of a small-sized image pickup lens according to Examples 1 and 2 of the present invention.

Example 1

Lens data is shown in Tables 1, 2 and 3.

TABLE 1

(Example 1)
f = 4.191 mm, fB = 1.795 mm, F = 2.88, 2Y = 5.08 mm

| Surface No. | R (mm) | D (mm) | Nd | vd |
|---|---|---|---|---|
| 1 | 4.425 | 1.10 | 1.58313 | 59.4 |
| 2 | −9.128 | 0.20 | | |
| stop | ∞ | 0.20 | | |
| 3 | −3.207 | 1.20 | 1.53040 | 56.0 |
| 4 | −1.092 | 0.34 | | |
| 5 | −0.726 | 0.86 | 1.58300 | 30.0 |
| 6 | −1.524 | 0.10 | | |
| 7 | 2.538 | 1.14 | 1.53040 | 56.0 |
| 8 | 2.712 | | | |

TABLE 2

Coefficients of aspherical surface

Third surface

K =     9.21940
A4 =  −1.90800 × 10$^{-2}$
A6 =    3.78880 × 10$^{-2}$

TABLE 2-continued

Coefficients of aspherical surface

A8 = −1.01770 × 10$^{-1}$
A10 = 1.61350 × 10$^{-1}$

Fourth surface

K = −2.43830 × 10$^{-1}$
A4 = 1.33880 × 10$^{-1}$
A6 = 1.41590 × 10$^{-2}$
A8 = 9.87250 × 10$^{-3}$
A10 = 2.11700 × 10$^{-2}$

Fifth surface

K = −1.91890
A4 = 1.13150 × 10$^{-1}$
A6 = 8.99300 × 10$^{-3}$
A8 = −3.76430 × 10$^{-3}$
A10 = 6.11200 × 10$^{-3}$
A12 = −3.26330 × 10$^{-3}$

Sixth surface

K = −3.37000 × 10$^{-1}$
A4 = 8.35040 × 10$^{-2}$
A6 = 2.41350 × 10$^{-2}$
A8 = −5.17700 × 10$^{-3}$
A10 = −3.05050 × 10$^{-3}$
A12 = 1.39000 × 10$^{-3}$

Seventh surface

K = −11.9490
A4 = −2.26290 × 10$^{-2}$
A6 = −1.73770 × 10$^{-3}$
A8 = 1.64710 × 10$^{-3}$
A10 = −3.32140 × 10$^{-4}$
A12 = −1.80240 × 10$^{-4}$

Eighth surface

K = −4.42490
A4 = −4.22960 × 10$^{-2}$
A6 = 9.36890 × 10$^{-3}$
A8 = −2.19520 × 10$^{-3}$
A10 = 2.15000 × 10$^{-4}$
A12 = −1.52000 × 10$^{-5}$

TABLE 3

| | Example 1 |
|---|---|
| (1), (18) L/2Y | 1.36 |
| (2), (5), (19) f12/f | 0.55 |
| (3), (6) {(ν1 + ν2)/2} − ν3 | 27.7 |
| (7), (9) R5/{(N3 − 1) · f} | −0.30 |
| (8) fa/f | 0.41 |
| (10), (14) X − X0 | h = hmax (2.2 mm) − 0.0758 |
| | h = 0.7 X hmax − 0.0169 |
| | h = 0.5 X hmax − 0.0050 |
| (13), (17) |f/f234| | 0.46 |
| (20) νP − νN | 26.0 |

Figure 6A:
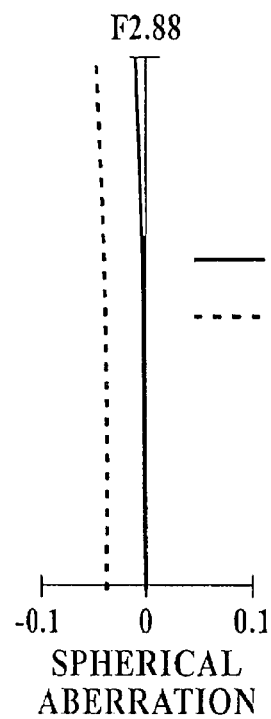
FIGS. 6A to 6E are views of various types aberration according to Example 1.
Figure 6B:
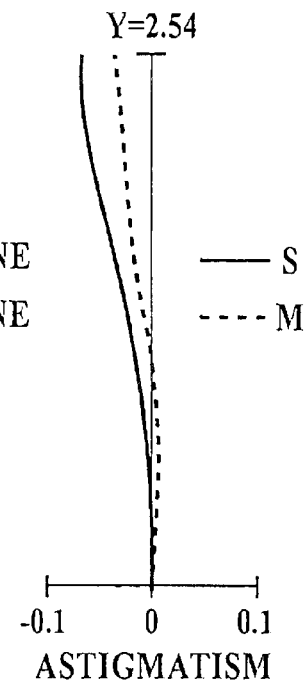
Figure 6C:
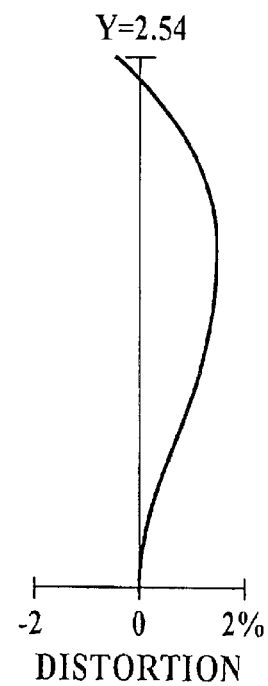
Figure 6D:
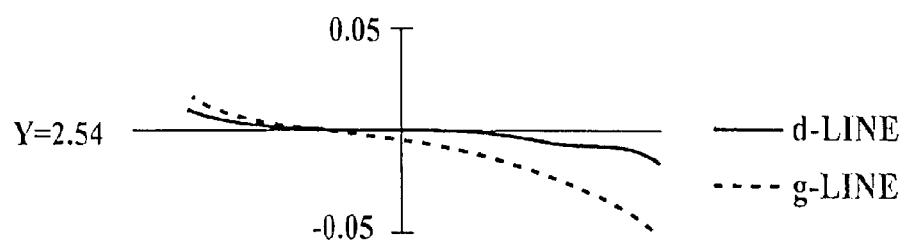
Figure 6E:
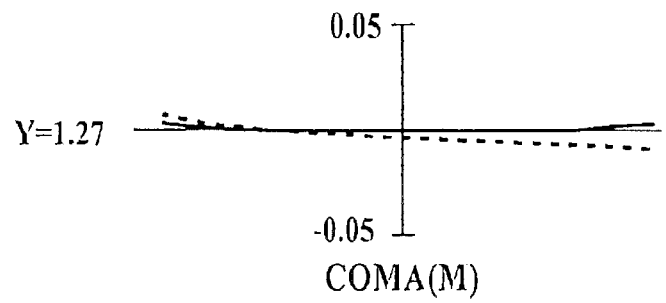

In FIG. 5, L1 indicates a first lens, L2 indicates a second lens, L3 indicates a third lens, L4 indicates a fourth lens, and S indicates a stop. FIGS. 6A to 6E are views of various types aberration according to Example 1, FIG. 6A shows spherical aberration, FIG. 6B shows astigmatism, FIG. 6C shows distortion, and FIGS. 6D and 6E show meridional coma.

The first lens L1 is formed out of the glass material. The second lens L2 and the fourth lens L4 are plastic lenses of polyolefin, and saturated water absorption rates of the lenses L2 and L4 are respectively not more than 0.01%. Also, the third lens L3 is a plastic lens of polycarbonate, and a saturated water absorption rate of the lens L3 is 0.4%.

The change of the refractive index Nd with the temperature of the plastic material is shown in Table 4. Thereby when the temperature is increased from a normal temperature (20° C.) by +30° C., a degree (ΔfB) of change of the back focal length is +0.001 mm.

TABLE 4

| | Refractive index at normal temperature | Refractive index at temperature increased by +30° C. from normal temperature |
|---|---|---|
| Second lens, fourth lens | 1.5304 | 1.5276 |
| Third lens | 1.5830 | 1.5788 |

Example 2

Lens data is shown in Tables 5, 6 and 7.

TABLE 5

(Example 2)
f = 4.200 mm, fB = 1.791 mm, F = 2.88, 2Y = 5.08 mm

| Surface No. | R (mm) | D (mm) | Nd | νd |
|---|---|---|---|---|
| 1 | 3.917 | 1.10 | 1.51633 | 64.1 |
| 2 | −8.052 | 0.20 | | |
| stop | ∞ | 0.20 | | |
| 3 | −3.422 | 1.20 | 1.53040 | 56.0 |
| 4 | −1.083 | 0.31 | | |
| 5 | −0.732 | 0.86 | 1.58300 | 30.0 |
| 6 | −1.527 | 0.10 | | |
| 7 | 2.426 | 1.07 | 1.53040 | 56.0 |
| 8 | 2.322 | | | |

TABLE 6

Coefficients of aspherical surface

Third surface

K = 9.31360
A4 = −3.44480 × 10$^{-2}$
A6 = 5.08930 × 10$^{-2}$
A8 = −1.53070 × 10$^{-1}$
A10 = 1.61750 × 10$^{-1}$

Fourth surface

K = −4.31080 × 10$^{-1}$
A4 = 1.22030 × 10$^{-1}$
A6 = −1.44230 × 10$^{-2}$
A8 = 1.37060 × 10$^{-2}$
A10 = 9.35930 × 10$^{-3}$

Fifth surface

K = −2.00120
A4 = 1.12270 × 10$^{-1}$
A6 = 2.28080 × 10$^{-3}$
A8 = −8.64850 × 10$^{-3}$
A10 = 7.55610 × 10$^{-3}$
A12 = −2.07840 × 10$^{-3}$

Sixth surface

K = −6.31350 × 10$^{-1}$
A4 = 8.67650 × 10$^{-2}$
A6 = 2.05150 × 10$^{-2}$
A8 = −8.87260 × 10$^{-3}$
A10 = −1.70460 × 10$^{-3}$
A12 = 1.04610 × 10$^{-3}$

Seventh surface

K = −10.5550
A4 = −2.40450 × 10$^{-2}$
A6 = −1.81580 × 10$^{-3}$
A8 = 1.68150 × 10$^{-3}$

TABLE 6-continued

Coefficients of aspherical surface

A10 = −3.21750 × 10⁻⁴
A12 = −1.78030 × 10⁻⁴

Eighth surface

K = −4.87370
A4 = −4.23390 × 10⁻²
A6 = 9.32800 × 10⁻³
A8 = −2.20080 × 10⁻³
A10 = 2.16970 × 10⁻⁴
A12 = −1.49000 × 10⁻⁵

TABLE 7

|  | Example 2 |
|---|---|
| (1), (18) L/2Y | 1.34 |
| (2), (5), (19) f12/f | 0.54 |
| (3), (6) {(ν1 + ν2)/2} − ν3 | 30.1 |
| (7), (9) R5/{(N3 − 1) · f} | −0.30 |
| (8) fa/f | 0.40 |
| (10), (14) X − X0 | h = hmax (2.2 mm) − 0.0757 |
|  | h = 0.7 X hmax − 0.0170 |
|  | h = 0.5 X hmax − 0.0050 |
| (13), (17) \|f/f234\| | 0.43 |
| (20) νP − νN | 26.0 |

Figure 7A:
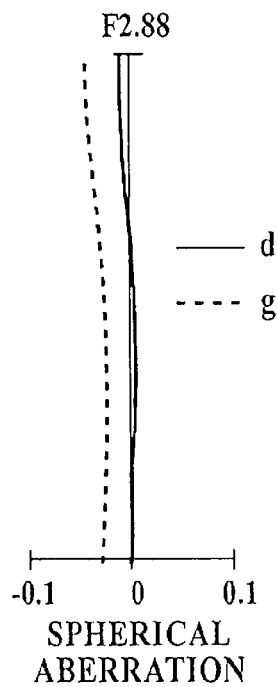
FIGS. 7A to 7E are views of various types aberration according to Example 2.
Figure 7B:
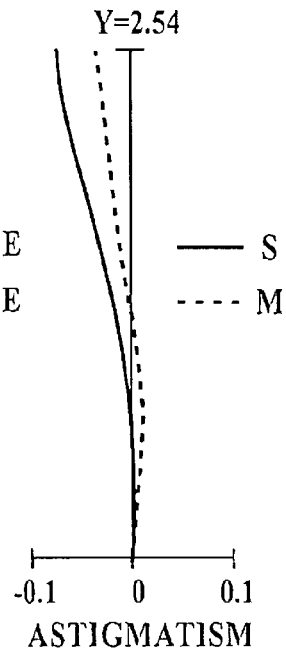
Figure 7C:
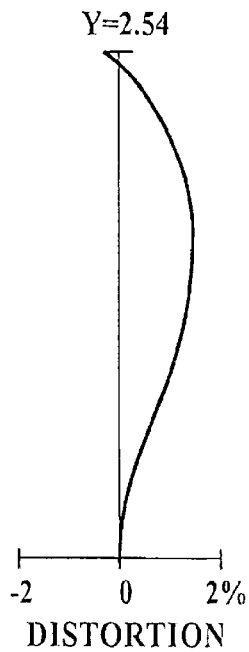
Figure 7D:
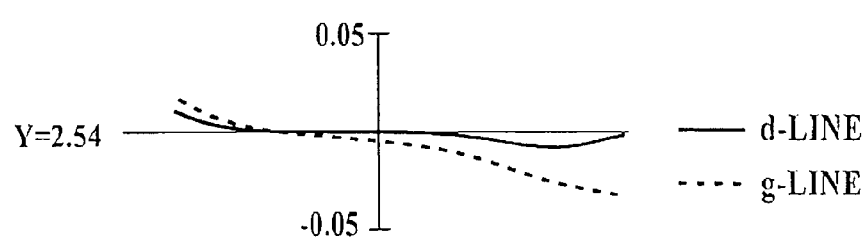
Figure 7E:
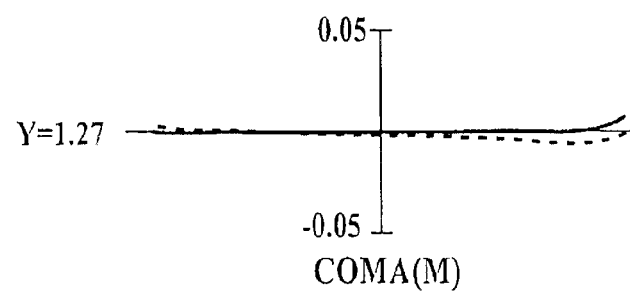

FIGS. 7A to 7E are views of various types aberration according to Example 2, FIG. 7A shows spherical aberration, FIG. 7B shows astigmatism, FIG. 7C shows distortion, and FIGS. 7D and 7E show meridional coma.

The first lens L1 is formed out of the glass material. The second lens L2 and the fourth lens L4 are plastic lenses of polyolefin, and saturated water absorption rates of the lenses L2 and L4 are respectively not more than 0.01%. Also, the third lens L3 is a plastic lens of polycarbonate, and a saturated water absorption rate of the lens L3 is 0.4%.

The change of the refractive index Nd with the temperature of the plastic material is shown in Table 8. Thereby when the temperature is increased from a normal temperature (20° C.) by +30° C., a degree (ΔfB) of change of the back focal length is +0.001 mm.

TABLE 8

|  | Refractive index at normal temperature | Refractive index at temperature increased by +30° C. from normal temperature |
|---|---|---|
| Second lens, fourth lens | 1.5304 | 1.5276 |
| Third lens | 1.5830 | 1.5788 |

Example 3

Lens data is shown in Tables 9, 10 and 11.

TABLE 9

(Example 3)
f = 5.309 mm, fB = 0.511 mm, F = 2.88, 2Y = 6.48 mm

| Surface No. | R (mm) | D (mm) | Nd | νd |
|---|---|---|---|---|
| stop | ∞ | 0.00 |  |  |
| 1 | 3.227 | 1.27 | 1.69680 | 55.5 |

TABLE 9-continued (Example 3)
f = 5.309 mm, fB = 0.511 mm, F = 2.88, 2Y = 6.48 mm

| Surface No. | R (mm) | D (mm) | Nd | νd |
|---|---|---|---|---|
| 2 | −87.050 | 0.44 |  |  |
| 3 | −3.364 | 1.40 | 1.52500 | 56.0 |
| 4 | −1.626 | 0.35 |  |  |
| 5 | −1.021 | 0.90 | 1.58300 | 30.0 |
| 6 | −2.147 | 0.10 |  |  |
| 7 | 2.462 | 1.10 | 1.52500 | 56.0 |
| 8 | 2.283 | 1.00 |  |  |
| 9 | ∞ | 0.30 | 1.51633 | 64.1 |
| 10 | ∞ |  |  |  |

TABLE 10

Coefficients of aspherical surface

Third surface

K = −3.69470
A4 = −2.00408 × 10⁻²
A6 = 5.93561 × 10⁻³
A8 = 5.22016 × 10⁻⁴
A10 = −2.38137 × 10⁻⁴

Fourth surface

K = −8.46375 × 10⁻¹
A4 = −2.02564 × 10⁻²
A6 = 1.62756 × 10⁻²
A8 = −4.14965 × 10⁻³
A10 = 6.66591 × 10⁻⁴

Fifth surface

K = −8.10560 × 10⁻¹
A4 = 6.31710 × 10⁻²
A6 = 4.14530 × 10⁻⁴
A8 = 4.30470 × 10⁻³
A10 = −2.38210 × 10⁻³
A12 = 3.81300 × 10⁻⁴

Sixth surface

K = −4.69690 × 10⁻¹
A4 = 1.50160 × 10⁻²
A6 = 9.94400 × 10⁻³
A8 = −2.33050 × 10⁻³
A10 = 3.92580 × 10⁻⁴
A12 = −2.86340 × 10⁻⁵

Seventh surface

K = −8.06986
A4 = −1.22203 × 10⁻²
A6 = −1.10253 × 10⁻³
A8 = 2.97022 × 10⁻⁴
A10 = −1.61617 × 10⁻⁵
A12 = −1.33104 × 10⁻⁶

Eight surface

K = −4.95420
A4 = −1.49047 × 10⁻²
A6 = 7.29589 × 10⁻⁴
A8 = −2.84963 × 10⁻⁴
A10 = 4.02284 × 10⁻⁵
A12 = −2.14994 × 10⁻⁶

TABLE 11

|  | Example 3 |
|---|---|
| (4) L'/2Y | 1.12 |
| (2), (5), (19) f12/f | 0.60 |
| (3), (6) {(ν1 + ν2)/2} − ν3 | 25.75 |
| (7), (9) R5/((N3 − 1) · f) | −0.33 |

TABLE 11-continued

|  | Example 3 |
|---|---|
| (8) fa/f | 0.39 |
| (10), (14) X − X0 | h = hmax (2.9 mm) − 1.1140 |
|  | h = 0.7 X hmax − 0.0247 |
|  | h = 0.5 X hmax − 0.0063 |
| (13), (17) \|f/f234\| | 0.15 |
| (20) νP − νN | 25.5 |

Figure 8:
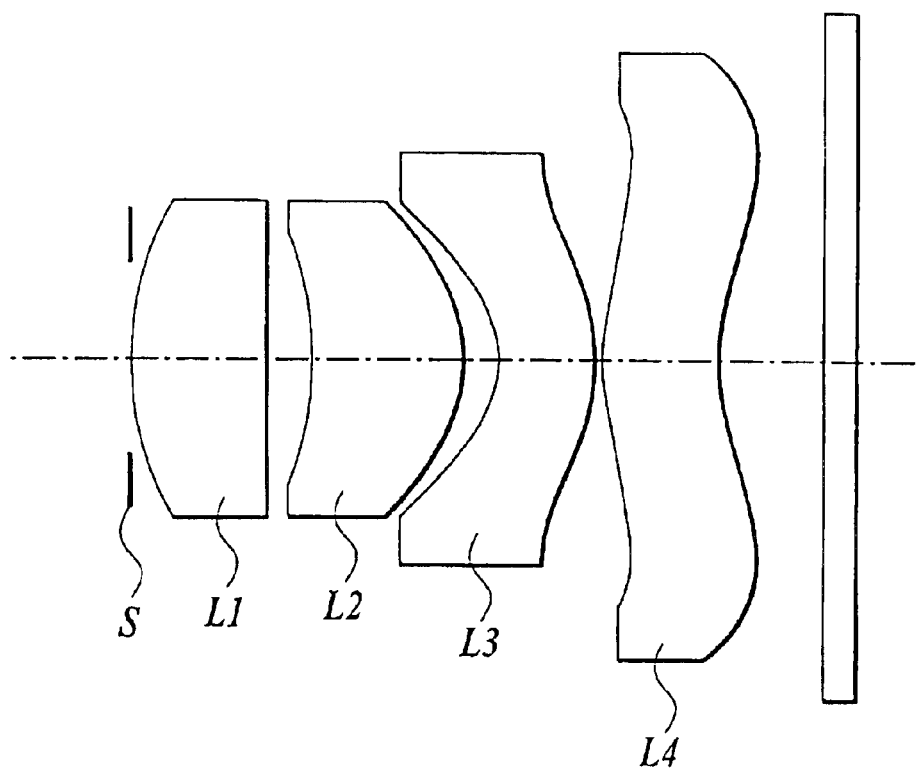
FIG. 8 is a representative sectional view of a small-sized image pickup lens according to Example 3 of the present invention.
Figure 9A:
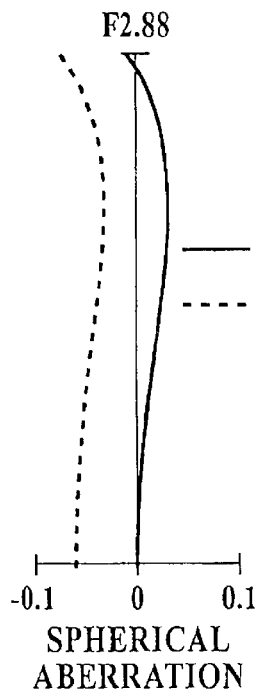
FIGS. 9A to 9E are views of various types aberration according to Example 3.
Figure 9B:
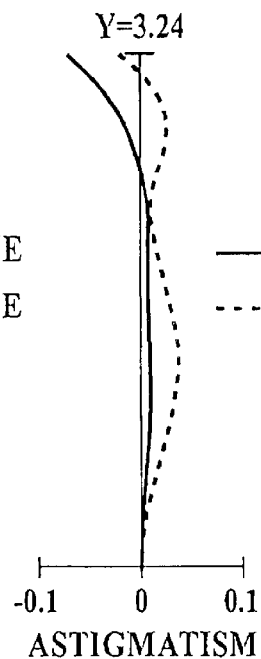
Figure 9C:
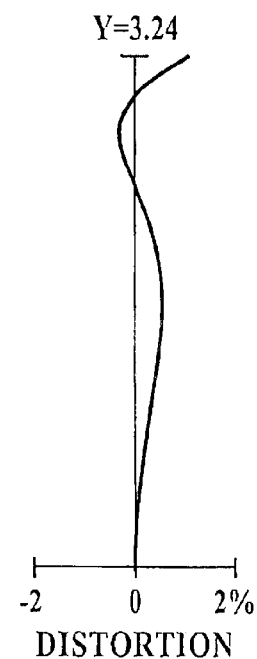
Figure 9D:
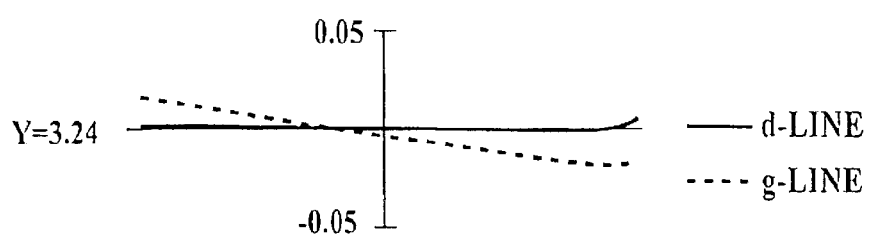
Figure 9E:
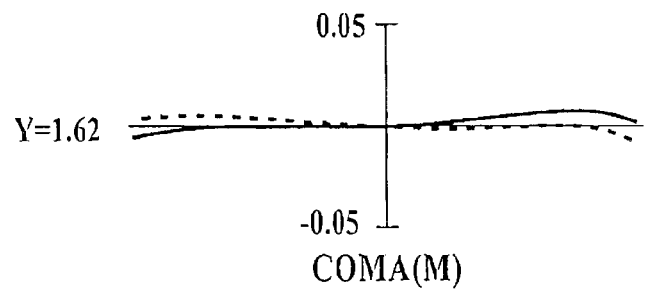

FIG. 8 is a representative sectional view of a small-sized image pickup lens according to Example 3 of the present invention. FIGS. 9A to 9E are views of various types aberration according to Example 3, FIG. 9A shows spherical aberration, FIG. 9B shows astigmatism, FIG. 9C shows distortion, and FIGS. 9D and 9E show meridional coma.

In Example 3, the aperture stop S is arranged on the side nearest to the object side, and a plane parallel plate corresponding to an infrared ray cut filter is arranged nearest to the image side.

The first lens L1 is formed out of the glass material. The second lens L2 and the fourth lens L4 are plastic lenses of polyolefin, and saturated water absorption rates of the lenses L2 and L4 are respectively not more than 0.01%. Also, the third lens L3 is a plastic lens of polycarbonate, and a saturated water absorption rate of the lens L3 is 0.4%.

The change of the refractive index Nd with the temperature of the plastic material is shown in Table 12. Thereby, when the temperature is increased from a normal temperature (20° C.) by +30° C., a degree (ΔfB) of change of the back focal length is −0.006 mm.

TABLE 12

|  | Refractive index at normal temperature | Refractive index at temperature increased by +30° C. from normal temperature |
|---|---|---|
| Second lens, fourth lens | 1.5250 | 1.5214 |
| Third lens | 1.5830 | 1.5788 |

Example 4

Lens data is shown in Tables 13, 14 and 15.

TABLE 13

(Example 4)
f = 3.952 mm, fB = 0.437 mm, F = 2.88, 2Y = 4.76 mm

| Surface No. | R (mm) | D (mm) | Nd | νd |
|---|---|---|---|---|
| stop | ∞ | 0.05 |  |  |
| 1 | 3.913 | 0.93 | 1.69680 | 55.5 |
| 2 | 346.379 | 0.18 |  |  |
| 3 | −20.920 | 1.20 | 1.52500 | 56.0 |
| 4 | −1.410 | 0.32 |  |  |
| 5 | −0.566 | 0.80 | 1.58300 | 30.0 |
| 6 | −1.702 | 0.10 |  |  |
| 7 | 1.248 | 1.04 | 1.52500 | 56.0 |
| 8 | 2.707 | 0.75 |  |  |
| 9 | ∞ | 0.30 | 1.51633 | 64.1 |
| 10 | ∞ | 0.20 |  |  |
| 11 | ∞ | 0.40 | 1.51633 | 64.1 |
| 12 | ∞ |  |  |  |

TABLE 14

Coefficients of aspherical surface

Third surface

K = −1.34157 × $10^{-3}$
A4 = −1.15552 × $10^{-2}$
A6 = −9.72356 × $10^{-2}$
A8 = 1.64161 × $10^{-1}$
A10 = −1.69526 × $10^{-1}$
A12 = 5.93581 × $10^{-2}$

Fourth surface

K = −3.64290
A4 = −7.87313 × $10^{-2}$
A6 = −8.13418 × $10^{-2}$
A8 = 6.89382 × $10^{-2}$
A10 = −1.35061 × $10^{-2}$
A12 = −1.46313 × $10^{-3}$

Fifth surface

K = −2.20465
A4 = −1.19476 × $10^{-1}$
A6 = 1.02295 × $10^{-1}$
A8 = −4.96877 × $10^{-2}$
A10 = 3.08960 × $10^{-2}$
A12 = −8.23237 × $10^{-3}$

Sixth surface

K = −1.11107
A4 = 3.10033 × $10^{-2}$
A6 = 2.14144 × $10^{-2}$
A8 = −2.26865 × $10^{-3}$
A10 = −1.88014 × $10^{-3}$
A12 = 4.46605 × $10^{-4}$

Seventh surface

K = −4.23704
A4 = −8.16271 × $10^{-4}$
A6 = 1.75735 × $10^{-3}$
A8 = −1.91328 × $10^{-3}$
A10 = 4.88327 × $10^{-4}$
A12 = −5.69413 × $10^{-5}$

Eighth surface

K = −8.14983 × $10^{-1}$
A4 = −2.99336 × $10^{-2}$
A6 = 4.55187 × $10^{-3}$
A8 = −1.39696 × $10^{-3}$
A10 = 1.81788 × $10^{-4}$
A12 = −1.40282 × $10^{-5}$

TABLE 15

|  | Example 3 |
|---|---|
| (4) L'/2Y | 1.35 |
| (2), (5), (19) f12/f | 0.58 |
| (3), (6) {(ν1 + ν2)/2} − ν3 | 25.75 |
| (7), (9) R5/((N3 − 1) · f) | −0.25 |
| (8) fa/f | 0.34 |
| (10), (14) X − X0 | h = hmax (2.3 mm) − 0.8121 |
|  | h = 0.7 X hmax − 0.1679 |
|  | h = 0.5 X hmax − 0.0454 |
| (13), (17) \|f/f234\| | 0.60 |
| (20) νP − νN | 26.0 |

Figure 10:
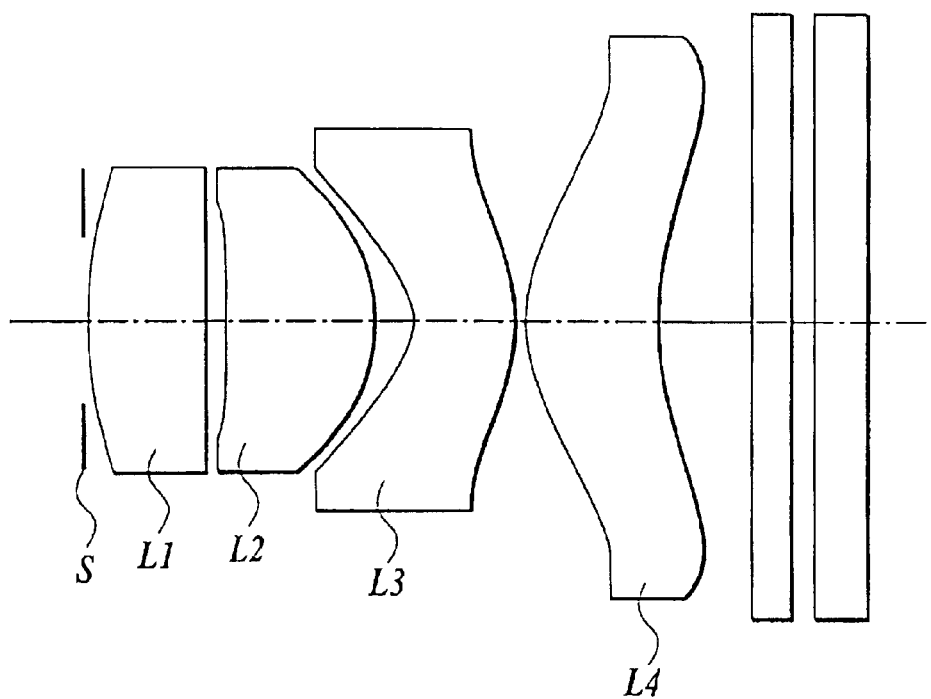
FIG. 10 is a representative sectional view of a small-sized image pickup lens according to Example 4 of the present invention.

FIG. 10 is a representative sectional view of a small-sized image pickup lens according to Example 4 of the present invention, FIGS. 11A to 11E are views of various types aberration according to Example 4, FIG. 11A shows spherical aberration, FIG. 11B shows astigmatism, FIG. 11C shows distortion, and FIGS. 11D and 11E show meridional coma.

In Example 3, the aperture stop S is arranged nearest to the object side, and a plane parallel plate corresponding to an infrared ray cut filter is arranged.

The first lens L1 is formed out of the glass material. The second lens L2 and the fourth lens L4 are plastic lenses of polyolefin, and saturated water absorption rates of the lenses L2 and L4 are respectively not more than 0.01%. Also, the third lens L3 is a plastic lens of polycarbonate, and a saturated water absorption rate of the lens L3 is 0.4%.

The change of the refractive index Nd with the temperature of the plastic material is shown in Table 16. Thereby, when the temperature is increased from a normal temperature (20° C.) by +30° C., a degree (ΔfB) of change of the back focal length is +0.010 mm.

TABLE 16

|  | Refractive index at normal temperature | Refractive index at temperature increased by +30° C. from normal temperature |
|---|---|---|
| Second lens, fourth lens | 1.5250 | 1.5214 |
| Third lens | 1.5830 | 1.5788 |

Here, the degree (ΔfB) of change of the back focal length caused by the increase of the temperature is calculated while disregarding the influence of thermal expansion of the plastic lens caused by the increase of the temperature. The reason is that the positional change of the image point caused by the increase of the temperature is mainly caused by the change of the refractive index of the plastic lens.

In Examples 1 to 4, the design for the maintenance of a telecentric characteristic of a light flux on the image side is not sufficiently performed. The telecentric characteristic denotes that a principal ray of a light flux corresponding to each image point becomes parallel to the optical axis after the principal ray goes out from the final surface of the lenses. In other words, the telecentric characteristic denotes that the position of an exit pupil of the optical system is sufficiently set away from an image surface. When the telecentric characteristic deteriorates, the light flux is slantingly incident on the solid-state image pickup element, and a phenomenon (shading) for substantially decreasing an aperture efficiency in the periphery of an image screen is generated, and an amount of light in the periphery of the image screen runs short. However, in an earlier technique, the shading phenomenon can be reduced by reconsidering a layout of color filter and micro-lens array of the solid-state image pickup element. Accordingly, each of Examples 1 to 4 denotes a design example of an optical system further miniaturized according to the reduction of the requirement degree of the telecentric characteristic.

In the present invention, the plurality of positive lenses and the negative lens having the comparatively strong refractive power are arranged in that order from the object side, so that the total lens length can be easily shortened. Also, when the convex surface of the first lens faces toward the object side, the total lens length can be shortened.

Also, as to aberration correction, two positive lenses of the first lens and the second lens respectively having the positive refractive power are arranged nearest to the object side. Therefore, the positive refractive power can be distributed to the first and second lenses, and the generation of both the spherical aberration and the coma can be suppressed.

Also, the concave surface of the third lens faces toward the object side, and the third lens is set to be a negative lens (that is, a lens having the negative refractive power) having the meniscus shape. Therefore, the spherical aberration, the coma and the astigmatism can be preferably corrected. Further, the convex surface of the fourth lens faces toward the object side, and the fourth lens is formed in the meniscus shape. Therefore, the telecentric characteristic of the light flux on the image side can be easily maintained in the periphery of the image screen.

Also, when L/2Y or L'/2Y is set to be lower than the upper limit by satisfying the conditional formula (1) or (4), the total lens length can be shortened, and the lens outer diameter can be shortened by the multiplier effect. Accordingly, the whole image pickup device can be miniaturized and lightened in weight.

Also, when f12/f is set to be higher than the lower limit by satisfying the conditional formula (2) or (5), the combined positive refractive power of the first lens and the second lens is appropriately suppressed. Therefore, the generation of both the higher order spherical aberration and the coma can be suppressed to a low degree. Further, f12/f is set to be lower than the higher limit. Therefore, the combined positive refractive power of the first lens and the second lens is appropriately obtained, and the total lens length can be shortened.

Also, when the term $\{(v1+v2)/2\}-v3$ is set to be higher than the lower limit by satisfying the conditional formula (3) or (6), the axial chromatic aberration and the lateral chromatic aberration can be corrected in good balance.

The conditional formulas (1) to (3) and (4) to (6) indicate conditions for obtaining a small-sized image pickup lens in which the aberration is preferably corrected. In detail, the conditional formulas (1) and (4) indicate conditions for achieving the shortening of the total lens length. When L/2Y or L'/2Y is lower than the upper limit of the conditional formula (1) or (4), the total lens length is directed to be shortened. Here, the symbol L of the conditional formula (1) indicates a distance on the optical axis from the object side surface of the first lens to the image side focal point of the whole image pickup lens. The symbol L' of the conditional formula (4) indicates a distance on the optical axis from the aperture stop to the image side focal point of the whole image pickup lens. Here, the "image side focal point" denotes an image point obtained when a parallel ray parallel to the optical axis is incident on the image pickup lens.

Also, when $R5/((N3-1)\cdot f)$ is set to be lower than the upper limit by satisfying the conditional formula (7) or (9), the excess of the negative refractive power of the object side surface of the third lens can be avoided. Therefore, the generation of the excessive spherical aberration and the generation of coma flare of an abaxial light flux can be suppressed, and a preferable image quality can be obtained. Further, when $R5/((N3-1)\cdot f)$ is set to be higher than the lower limit of the conditional formula (7) or (9), the negative refractive power of the object side surface of the third lens can be maintained, and a positive Petzval's sum is lowered. Therefore, the curvature of image surface, the axial chromatic aberration and the lateral chromatic aberration can be preferably corrected.

Also, the positive refractive power of the air lens formed between the third lens and the fourth lens can be appropriately set according to the conditional formula (8). Therefore, the correction of the curvature of image surface and the distortion and the maintenance of the telecentric characteristic of the light flux on the image side can be performed in good balance.

Also, when the image side surface of the fourth lens and placed nearest to the image side is formed in the aspheric shape satisfying the conditional formula (10), the telecentric characteristic particularly for the light flux at the high angle of view can be maintained.

Also, the positive first lens is formed out of the glass material of which the refractive index hardly changes with the temperature, and the second, third and fourth lenses are formed out of the plastic material. The second lens is the positive lens having the comparatively strong refractive power, and the third lens is the negative lens having the comparatively strong refractive power. Therefore, the influence of the second lens on the position of the image point changing with the temperature can cancel out that of the third lens, and the positional change of the image point in the whole image pickup lens caused by the temperature change can be suppressed to a low degree.

Accordingly, the influence of the plastic material is reduced, and a miniaturized lightweight image pickup lens can be obtained at low cost due to the effect of the plastic material.

Also, because the first lens is set as the glass lens, no plastic lens easily scratched is exposed to the outside. Therefore, the maintenance of the image pickup lens can be improved.

Also, the first lens and the second lens respectively have the positive refractive power, and the required refractive power is distributed to the first and second lenses. Therefore, it is not required to extremely lower the curvature radius in each lens. Accordingly, the forming work for the glass lens denoting the first lens can be easily performed, and the productivity of the first lens can be improved.

Also, the second, third and fourth lenses are formed out of the plastic material. Therefore, the shape of the flange portion of each lens placed out of an area of the lens effective diameter can be freely designed while integrally forming the flange portion and the lens. Assuming that the flange portions of the lenses are easily fitted onto each other, the structure of the lenses can be obtained so as to easily make the optical axes of the lenses agree with each other. Further, when the lens structure is set to make each flange determine the interval of the corresponding pair of lenses, no spacer is required. Therefore, the number of parts of the image pickup lens can be reduced, and the productivity of the image pickup lens can be improved.

Also, because the lenses are formed out of the plastic material, each lens can be easily formed in the aspheric shape, and the correction of aberration can be easily performed.

Also, the lenses are set so as to satisfy the conditional formula (13). Therefore, the combined focal length of the plastic lenses can be set to a large value to suppress a sum of values of the refractive power of the lenses to a low value, and the positional change of the image point caused by the temperature change can be suppressed to a low degree.

Also, the plastic material having the saturated water absorption rate not more than 0.7% is used. Therefore, the non-uniformity of the refractive index of the lens caused by a rapid change of humidity can be suppressed, and the effects of the plastic lens can be obtained while maintaining a preferable image forming performance.

Also, the first positive lens having the convex surface, which is placed nearest to the object side and faces toward the object side, is arranged. Therefore, the total lens length can be shortened as compared with a first negative lens.

Also, one positive lens having the positive refractive power is set to a glass lens, and another positive lens and one negative lens are set to plastic lenses. Therefore, the large positive refractive power can be distributed to the glass lens and the plastic lens. Further, the influence of the plastic lens having the positive refractive power on the positional change of the image point caused by the temperature change cancels out that of the plastic lens having the negative refractive power. Therefore, effects of the miniaturization, the lightening-in-weight and the mass productivity of the lens can be obtained due to the plastic lens.

Also, in the present invention, the image side surface of the fourth lens is formed in the aspheric shape. Therefore, the telecentric characteristic particularly for the light flux at the high angle of view can be maintained.

In the present invention, three lenses selected from the first, second, third and fourth lenses are formed out of the plastic material. Therefore, effects of the miniaturization, the lightening-in-weight, the low cost based on the mass productivity and the easy formation of the aspherical surface can be obtained due to the lenses formed out of the plastic material.

Also, the first lens is formed out of the glass material. Therefore, the generation of flaws in the first lens of the position damaged most easily can be reduced, the first lens protects the other lenses formed out of the plastic material, and the maintenance of the first lens can be improved.

Also, the lenses are set so as to satisfy the conditional formula (17). Therefore, the combined focal length of the plastic lenses can be set to a large value to suppress a sum of values of the refractive power of the lenses to a low value, and the positional change of the image point caused by the temperature change can be suppressed to a low degree.

Also, the plastic material having the saturated water absorption rate not more than 0.7% is used. Therefore, the non-uniformity of the refractive index of the lens caused by a rapid change of humidity can be suppressed, and the effects of the plastic lens can be obtained while maintaining a preferable image forming performance.

Also, the total lens length can be shortened according to the conditional formula (18), and the whole image pickup device can be miniaturized and lightened in weight.

Also, the total lens length can be appropriately shortened according to the conditional formula (19) while suppressing the generation of both the higher order spherical aberration and the coma to a low degree.

Also, the axial chromatic aberration and the lateral chromatic aberration can be corrected in good balance according to the conditional formula (20).

Also, the plurality of positive lenses and the negative lens respectively having the comparatively strong refractive power are arranged in that order from the object side, so that the total lens length can be easily shortened.

Also, the lens placed nearest to the object side has the positive refractive power to shorten the length in the optical axis, and the image pickup lens comprises four lenses.

Because the number of lenses is four, the correction of various types aberration, the improvement of the telecentric characteristic and the distribution of the refractive power can be easily obtained, and the image pickup unit advantageous for the miniaturization, the high image quality and the lightening-in-weight can be provided.

In the present invention, the image pickup lens having the above-described effects is mounted on the image pickup unit. Therefore, the image pickup unit having effects of the miniaturization, the lightening-in-weight and the high image quality can be provided.

In the present invention, the image pickup unit described above is mounted on the portable terminal. Therefore, a miniaturized lightweight portable terminal capable to form an image at the high image quality can be provided.

The entire disclosure of Japanese Patent Application No. Tokugan 2002-209625 filed on Jul. 18, 2002 including specification, claims, drawings and summary are incorporated herein by reference in its entirety.

What is claimed is:

1. An image pickup lens comprising four lenses arranged in an order of a first lens, a second lens, a third lens and a fourth lens from an object side, wherein the first lens has positive refractive power and has a convex surface facing toward the object side, the second lens has the positive refractive power, the third lens has negative refractive power and has a concave surface facing toward the object side to be formed in a meniscus shape, and the fourth lens has the positive or negative refractive power and has a convex surface facing toward the object side to be formed in the meniscus shape.

2. The image pickup lens of claim 1; wherein following conditional formulas (1), (2) and (3) are satisfied:

$$L/2Y < 1.60 \quad (1)$$

$$0.40 < f12/f < 0.70 \quad (2)$$

$$25 < \{(v1+v2)/2\} - v3 \quad (3),$$

where L denotes a distance on an optical axis from the object side surface of the first lens to an image side focal point of the whole image pickup lens, 2Y denotes the length of a diagonal line on an effective image screen, f12 denotes a combined focal length of the first lens and the second lens, f denotes a focal length of the whole image pickup lens, v1 denotes an Abbe number of the first lens, v2 denotes an Abbe number of the second lens, and v3 denotes an Abbe number of the third lens.

3. The image pickup lens of claim 1; wherein an aperture stop is arranged nearest to the object side.

4. The image pickup lens of claim 3; wherein following conditional formulas (4), (5) and (6) are satisfied:

$$L'/2Y < 1.60 \quad (4)$$

$$0.40 < f12/f < 0.70 \quad (5)$$

$$25 < \{(v1+v2)/2\} - v3 \quad (6),$$

where L' denotes a distance on an optical axis from the aperture stop to an image side focal point of the whole image pickup lens, 2Y denotes the length of a diagonal line on an effective image screen, f12 denotes a combined focal length of the first lens and the second lens, f denotes a focal length of the whole image pickup lens, v1 denotes an Abbe number of the first lens, v2 denotes an Abbe number of the second lens, and v3 denotes an Abbe number of the third lens.

5. The image pickup lens of claim 1; wherein following conditional formulas (7) and (8) are satisfied:

$$-0.40 < R5/((N3-1) \cdot f) < -0.20 \quad (7)$$

$$0.30 < fa/f < 0.50 \quad (8),$$

where f denotes a focal length of the whole image pickup lens, R5 denotes a curvature radius of the object side surface of the third lens facing, N3 denotes a refractive index of the third lens at a d-line, and fa denotes a focal length of an air lens formed by an image side surface of the third lens and the object side surface of the fourth lens.

6. The image pickup lens of claim 5; wherein a following conditional formula (9) is satisfied:

$$-0.40 < R5/((N3-1) \cdot f) < -0.25 \quad (9).$$

7. The image pickup lens of claim 1; wherein an image side surface of the fourth lens satisfies a following conditional formula (10):

$$X - X0 < 0 \quad (10)$$

for a displacement value X of an aspherical surface expressed in the formula (11):

$$X = \frac{h^2/R8}{1 + \sqrt{1-(1+K8)h^2/R8^2}} + \sum A_i h^i \quad (11)$$

and a displacement value X0 of a rotational quadratic surface component of the aspherical surface expressed in the formula (12):

$$X0 = \frac{h^2/R8}{1 + \sqrt{1-(1+K8)h^2/R8^2}} \quad (12)$$

in a range of h satisfying hmax X 0.5<h<hmax, where a vertex of the image side surface of the fourth lens is set as an origin, a direction of an optical axis is set as an X-axis, h denotes a height in an arbitrary direction perpendicular to the optical axis, Ai denotes an i-th order coefficient of the aspherical surface for the image side surface of the fourth lens, hmax denotes a maximum effective radius, R8 denotes a curvature radius of the image side surface of the fourth lens, and K8 denotes a conic constant for the image side surface of the fourth lens.

8. The image pickup lens of claim 1; wherein the first lens is formed out of glass material, and the second, third and fourth lenses are formed out of plastic material.

9. The image pickup lens of claim 8; wherein a following conditional formula (13) is satisfied:

$$|f/f234| < 0.7 \quad (13),$$

where f234 denotes a combined focal length of the second, third and fourth lenses, and f denotes a focal length of the whole image pickup lens.

10. The image pickup lens of claim 8; wherein a saturated water absorption rate of the plastic material is not more than 0.7%.

11. An image pickup unit comprising:
a solid-state image pickup element having a photoelectric transfer unit;
the image pickup lens of claim 1 for forming an image of an object in the photoelectric transfer unit of the solid-state image pickup element;
a substrate for holding the solid-state image pickup element, the substrate comprising an external connection terminal through which an electric signal is transmitted or received; and
a casing made of a light shielding substance and comprising an opening for incident light entering an object side,
wherein the solid-state image pickup element, the image pickup lens, the substrate and the casing are combined with each other, and
a length of the image pickup unit in a direction of an optical axis of the image pickup lens is not more than 15 mm.

12. An image pickup lens comprising four lenses arranged in an order of a first lens, a second lens, a third lens and a fourth lens from an object side,
wherein the first lens has positive refractive power and has a convex surface facing toward the object side, one lens or two lenses selected from the second, third and fourth lenses have the positive refractive power, at least one lens of the positive refractive power selected from the first, second, third and fourth lenses is formed out of glass material, another lens of the positive refractive power and one lens of negative refractive power selected from the first, second, third and fourth lenses are formed out of plastic material, and an image side surface of the fourth lens satisfies a following conditional formula (14):

$$X - X0 < 0 \tag{14}$$

for a displacement value X of an aspherical surface expressed in the formula (15):

$$X = \frac{h^2/R8}{1 + \sqrt{1 - (1+K8)h^2/R8^2}} + \sum A_i h^i \tag{15}$$

and a displacement value X0 of a rotational quadratic surface component of the aspherical surface expressed in the formula (16):

$$X0 = \frac{h^2/R8}{1 + \sqrt{1 - (1+K8)h^2/R8^2}} \tag{16}$$

in a range of h satisfying hmax × 0.5<h<hmax, where a vertex of the image side surface of the fourth lens is set as an origin, a direction of an optical axis is set as an X-axis, h denotes a height in an arbitrary direction perpendicular to the optical axis, Ai denotes an i-th order coefficient of the aspherical surface for the image side surface of the fourth lens, hmax denotes a maximum effective radius, R8 denotes a curvature radius of the image side surface of the fourth lens, and K8 denotes a conic constant for the image side surface of the fourth lens.

13. The image pickup lens of claim 12; wherein the lenses other than the lens having the positive refractive power and formed out of the glass material are formed out of the plastic material.

14. The image pickup lens of claim 13; wherein the first lens is formed out of the glass material.

15. The image pickup lens of claim 14; wherein a following conditional formula (17) is satisfied:

$$|f/f234| < 0.7 \tag{17},$$

where f234 denotes a combined focal length of the second, third and fourth lenses, and f denotes a focal length of the whole image pickup lens.

16. The image pickup lens of claim 12; wherein a saturated water absorption rate of the plastic material is not more than 0.7%.

17. The image pickup lens of claim 12; wherein following conditional formulas (18), (19) and (20) are satisfied:

$$L/2Y < 1.60 \tag{18}$$

$$0.40 < f12/f < 0.70 \tag{19}$$

$$25 < \nu P - \nu N \tag{20}$$

where L denotes a distance on an optical axis from the surface of the first lens to an image side focal point of the whole image pickup lens, 2Y denotes the length of a diagonal line on an effective image screen, f12 denotes a combined focal length of the first lens and the second lens, f denotes a focal length of the whole image pickup lens, νP denotes an Abbe number of the lens having the strongest positive refractive power, νN denotes an Abbe number of the lens having the strongest negative refractive power.

18. The image pickup lens of claim 12; wherein the second lens has the positive refractive power, and the third lens has the negative refractive power.

19. An image pickup unit comprising:

a solid-state image pickup element having a photoelectric transfer unit;

the image pickup lens of claim 12 for forming an image of an object in the photoelectric transfer unit of the solid-state image pickup element;

a substrate for holding the solid-state image pickup element, the substrate comprising an external connection terminal through which an electric signal is transmitted or received; and a casing made of a light shielding substance and comprising an opening for incident light entering an object side, wherein the solid-state image pickup element, the image pickup lens, the substrate and the casing are combined with each other, and a length of the image pickup unit in a direction of an optical axis of the image pickup lens is not more than 15 mm.

20. An image pickup unit comprising:

a solid-state image pickup element having a photoelectric transfer unit;

an image pickup lens for forming an image of an object in the photoelectric transfer unit of the solid-state image pickup element;

a substrate for holding the solid-state image pickup element, the substrate comprising an external connection terminal through which an electric signal is transmitted or received; and a casing made of a light shielding substance and comprising an opening for incident light entering an object side, wherein the solid-state image pickup element, the image pickup lens, the substrate and the casing are combined with each other, a length of the image pickup unit in a direction of an optical axis of the image pickup lens is not more than 15 mm, the image pickup lens comprises four lenses arranged in an order from the object side, and the lens arranged nearest to the object side has the positive refractive power.

21. A portable terminal comprising the image pickup unit of claim 20.

* * * * *